United States Patent
Kim

(10) Patent No.: US 11,523,290 B2
(45) Date of Patent: *Dec. 6, 2022

(54) METHOD FOR MANAGING RADIO RESOURCES IN COMMUNICATION SYSTEM AND APPARATUS FOR THE SAME

(71) Applicant: ELECTRONICS AND TELECOMMUNICATIONS RESEARCH INSTITUTE, Daejeon (KR)

(72) Inventor: Jae Heung Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 149 days.

This patent is subject to a terminal disclaimer.

(21) Appl. No.: 17/034,498

(22) Filed: Sep. 28, 2020

(65) Prior Publication Data

US 2021/0014708 A1 Jan. 14, 2021

Related U.S. Application Data

(63) Continuation of application No. 16/131,222, filed on Sep. 14, 2018, now Pat. No. 10,873,866.

(30) Foreign Application Priority Data

| Sep. 27, 2017 | (KR) | 10-2017-0124876 |
| Nov. 7, 2017 | (KR) | 10-2017-0147569 |

(Continued)

(51) Int. Cl.
*H04W 76/27* (2018.01)
*H04W 24/04* (2009.01)
(Continued)

(52) U.S. Cl.
CPC .......... *H04W 24/04* (2013.01); *H04B 7/0404* (2013.01); *H04B 7/0617* (2013.01);
(Continued)

(58) Field of Classification Search
CPC ... H04W 24/04; H04W 76/27; H04W 72/046; H04W 24/10; H04W 56/001;
(Continued)

(56) References Cited

U.S. PATENT DOCUMENTS 7,957,298 B2 * 6/2011 Yi ....................... H04W 74/002
370/242
9,265,070 B2 * 2/2016 Yi ..................... H04W 74/0841
(Continued)

*Primary Examiner* — Hassan A Phillips
*Assistant Examiner* — Prenell P Jones
(74) *Attorney, Agent, or Firm* — LRK Patent Law Firm

(57) ABSTRACT

A beam management method, performed by a terminal in a communication system, includes receiving a control message including at least one parameter used for beam management from a first base station, performing a monitoring operation on a first beam configured between the first base station and the terminal based on the at least one parameter, detecting a beam problem in the first beam based on the monitoring operation, and in response to determination that the beam problem is detected in the first beam, performing a recovery operation on the first beam.

4 Claims, 8 Drawing Sheets

(30) Foreign Application Priority Data

| Feb. 12, 2018 | (KR) | 10-2018-0017157 |
|---|---|---|
| Jul. 20, 2018 | (KR) | 10-2018-0084630 |
| Aug. 6, 2018 | (KR) | 10-2018-0091430 |
| Aug. 31, 2018 | (KR) | 10-2018-0103454 |

(51) Int. Cl.

| H04W 72/04 | (2009.01) |
|---|---|
| H04W 24/10 | (2009.01) |
| H04B 7/06 | (2006.01) |
| H04W 56/00 | (2009.01) |
| H04W 76/28 | (2018.01) |
| H04B 7/0404 | (2017.01) |
| H04W 80/02 | (2009.01) |
| H04L 5/00 | (2006.01) |

(52) U.S. Cl.
CPC .......... *H04B 7/0695* (2013.01); *H04W 24/10* (2013.01); *H04W 56/001* (2013.01); *H04W 72/046* (2013.01); *H04W 76/27* (2018.02); *H04W 76/28* (2018.02); *H04L 5/0048* (2013.01); *H04L 5/0053* (2013.01); *H04W 80/02* (2013.01)

(58) Field of Classification Search
CPC .... H04W 76/28; H04W 80/02; H04B 7/0695; H04B 7/0617; H04L 5/0048; H04L 5/0053

See application file for complete search history.

(56) References Cited

U.S. PATENT DOCUMENTS

| 9,769,717 | B2 | 9/2017 | Park | |
|---|---|---|---|---|
| 2016/0183234 | A1 | 6/2016 | Sung et al. | |
| 2016/0353510 | A1 | 12/2016 | Zhang et al. | |
| 2017/0070937 | A1 | 3/2017 | Li et al. | |
| 2017/0207843 | A1 | 7/2017 | Jung et al. | |
| 2017/0288763 | A1 | 10/2017 | Yoo et al. | |
| 2017/0332406 | A1 | 11/2017 | Islam et al. | |
| 2020/0022207 | A1* | 1/2020 | Yu | H04W 76/15 |
| 2020/0145079 | A1* | 5/2020 | Marinier | H04W 74/0833 |

* cited by examiner

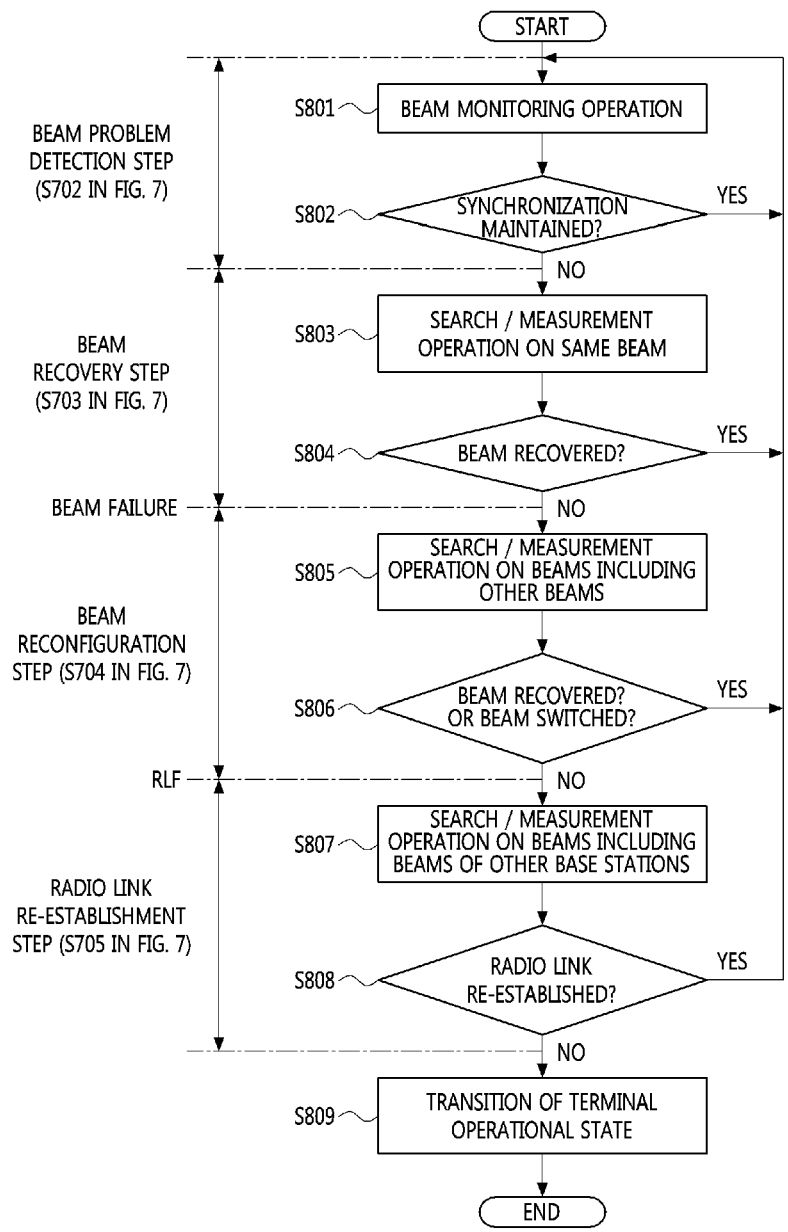

METHOD FOR MANAGING RADIO RESOURCES IN COMMUNICATION SYSTEM AND APPARATUS FOR THE SAME

CROSS-REFERENCE TO RELATED APPLICATIONS

This application claims priorities to Korean Patent Applications No. 10-2017-0124876 filed on Sep. 27, 2017, No. 10-2017-0147569 filed on Nov. 7, 2017, No. 10-2018-0017157 filed on Feb. 12, 2018, No. 10-2018-0084630 filed on Jul. 20, 2018, No. 10-2018-0091430 filed on Aug. 6, 2018, and No. 10-2018-0103454 filed on Aug. 31, 2018 in the Korean Intellectual Property Office (KIPO), the entire contents of which are hereby incorporated by reference.

BACKGROUND

1. Technical Field

The present disclosure relates to a technique for managing radio resources, and more particularly, to a beam management technique for ensuring terminal mobility.

2. Description of Related Art

A communication system (hereinafter, an 'integrated communication system') using a higher frequency band (e.g., a frequency band of 6 GHz or higher) than a frequency band (e.g., a frequency band lower below 6 GHz) of a long term evolution (LTE) based communication system (or, a LTE-A based communication system) is being considered for processing of soaring wireless data. The integrated communication system may comprise an access network, an Xhaul network, and a core network, and the Xhaul network may support communications between the access network and the core network.

The reception performance of a signal may deteriorate due to path loss of a radio wave and reflection of the radio wave in such the high frequency band (e.g., a frequency band of 6 GHz or higher), and a small base station supporting smaller cell coverage than that of a macro base station can be introduced into the integrated communication system in order to solve this problem. In the integrated communication system, the small base station may be connected to a core network using a wired backhaul link, in which case an initial investment cost, management cost, or the like of the integrated communication system may be increased.

Meanwhile, the integrated communication system may comprise the small base station performing all the functions of a communication protocol (e.g., a remote radio transmission and reception function, a baseband processing function), a plurality of transmission reception points (TRPs) performing the remote radio transmission and reception function among the functions of the communication protocol, a baseband unit (BBU) block performing the baseband processing function among the functions of the communication protocol, and the like. The TRP may be a remote radio head (RRH), a radio unit (RU), or the like. The BBU block may include at least one BBU or at least one digital unit (DU). The BBU block may be referred to as a 'BBU pool', a 'centralized BBU', or the like. One BBU block may be connected to a plurality of TRPs, and perform the baseband processing function on signals received from the plurality of TRPs and signals to be transmitted to the plurality of TRPs. In the integrated communication system, the small base station may be connected to the core network using a wireless backhaul link (e.g., a wireless backhaul link constituting the Xhaul network), and the TRP may be connected to the BBU block using a wireless fronthaul link (e.g., a wireless fronthaul link constituting the Xhaul network).

In the above-described integrated communication system, a beam management procedure, a radio link management procedure, and the like are required to ensure mobility of communication nodes (e.g., terminals).

SUMMARY

Accordingly, embodiments of the present disclosure provide beam management methods for ensuring mobility of terminals in a communication system.

In order to achieve the objective of the present disclosure, a beam management method performed by a terminal in a communication system may comprise receiving a control message including at least one parameter used for beam management from a first base station; performing a monitoring operation on a first beam configured between the first base station and the terminal based on the at least one parameter; detecting a beam problem in the first beam based on the monitoring operation; and in response to determination that the beam problem is detected in the first beam, performing a recovery operation on the first beam.

The terminal may include a physical (PHY) layer, a medium access control (MAC) layer, and a radio resource control (RRC) layer, and the monitoring operation and the recovery operation may be controlled by the MAC layer included in the terminal.

When a plurality of beams are configured between the first base station and the terminal, the monitoring operation and the recovery operation may be performed on a beam-by-beam basis.

In response to determination that the terminal is not synchronized with the first base station during a period indicated by the at least one parameter, the beam problem may be determined as detected in the first beam.

The PHY layer included in the terminal may determine whether the terminal is synchronized with the first base station, information on whether the terminal is synchronized with the first base station may be transmitted from the PHY layer to the MAC layer included in the terminal, and the MAC layer may determine the beam problem based on the information on whether the terminal is synchronized with the first base station.

In response to determination that a reception quality of reference signals received through the first beam during a period indicated by the at least one parameter is equal to or less than a reference value, the beam problem may be determined as detected in the first beam.

The control message may be a control channel of a physical layer (e.g., downlink control information (DCI)), a MAC control message, or an RRC message.

The beam management method may further comprise, in response to determination of a beam recovery failure by the beam recovery operation, performing a reconfiguration operation on another beam excluding the first beam among a plurality of beams supported by the first base station.

The reconfiguration operation may be performed in a MAC layer included in the terminal or an RRC layer included in the terminal.

The beam management method may further comprise, in response to determination of a radio link configuration failure by the reconfiguration operation, performing a re-establishment operation of a radio link with a second base station other than the first base station.

When a plurality of beams are configured between the first base station and the terminal and all of reconfiguration operations on the plurality of beams fail, the radio link configuration failure may be determined.

The re-establishment operation of the radio link may be performed by an RRC layer included in the terminal.

In response to determination that the re-establishment operation of the radio link fails, an operational state of the terminal may transition from an RRC_CONNECTED state to an RRC_INACTIVE state or an RRC_IDLE state.

In order to achieve the objective of the present disclosure, a terminal supporting a beam management operation in a communication system may comprise a processor and a memory storing at least one instruction executed by the processor. Here, the at least one instruction may be configured to receive a control message including at least one parameter used for beam management from a first base station; perform a monitoring operation on a first beam configured between the first base station and the terminal based on the at least one parameter; detect a beam problem in the first beam based on the monitoring operation; and in response to determination that the beam problem is detected in the first beam, perform a recovery operation on the first beam.

When a plurality of beams are configured between the first base station and the terminal, the monitoring operation and the recovery operation may be performed on a beam-by-beam basis.

In response to determination that the terminal is not synchronized with the first base station during a period indicated by the at least one parameter, the beam problem may be determined as detected in the first beam.

In response to determination that a reception quality of reference signals received through the first beam during a period indicated by the at least one parameter is equal to or less than a reference value, the beam problem may be determined as detected in the first beam.

The at least one instruction may be further configured to, in response to determination of a radio link configuration failure by the reconfiguration operation, perform a re-establishment operation of a radio link with a second base station other than the first base station.

When a plurality of beams are configured between the first base station and the terminal and all of reconfiguration operations on the plurality of beams fail, the radio link configuration failure may be determined.

In response to determination that the re-establishment operation of the radio link fails, an operational state of the terminal may transition from an RRC_CONNECTED state to an RRC_INACTIVE state or an RRC_IDLE state.

According to the embodiments of the present disclosure, one or more beams can be configured between the base station and the terminal, and the terminal may perform communications with the base station using the configured beams. When a beam problem is detected during the communications between the base station and the terminal, the terminal can perform a recovery operation on the beam in which the beam problem is detected. When the recovery operation fails, the terminal can perform a reconfiguration operation on another beam of the base station. When the reconfiguration operation fails, the terminal can perform a re-establishment operation of a radio link with another base station. Through the above-described beam management operation, a communication service can be seamlessly provided to the terminal, and mobility of the terminal can be efficiently controlled. Therefore, the performance of the communication system can be improved.

BRIEF DESCRIPTION OF DRAWINGS

Embodiments of the present disclosure will become more apparent by describing in detail embodiments of the present disclosure with reference to the accompanying drawings, in which:

FIG. 8 is a flow chart illustrating a first embodiment of a beam management procedure in a communication system.

DETAILED DESCRIPTION

Figure 1:
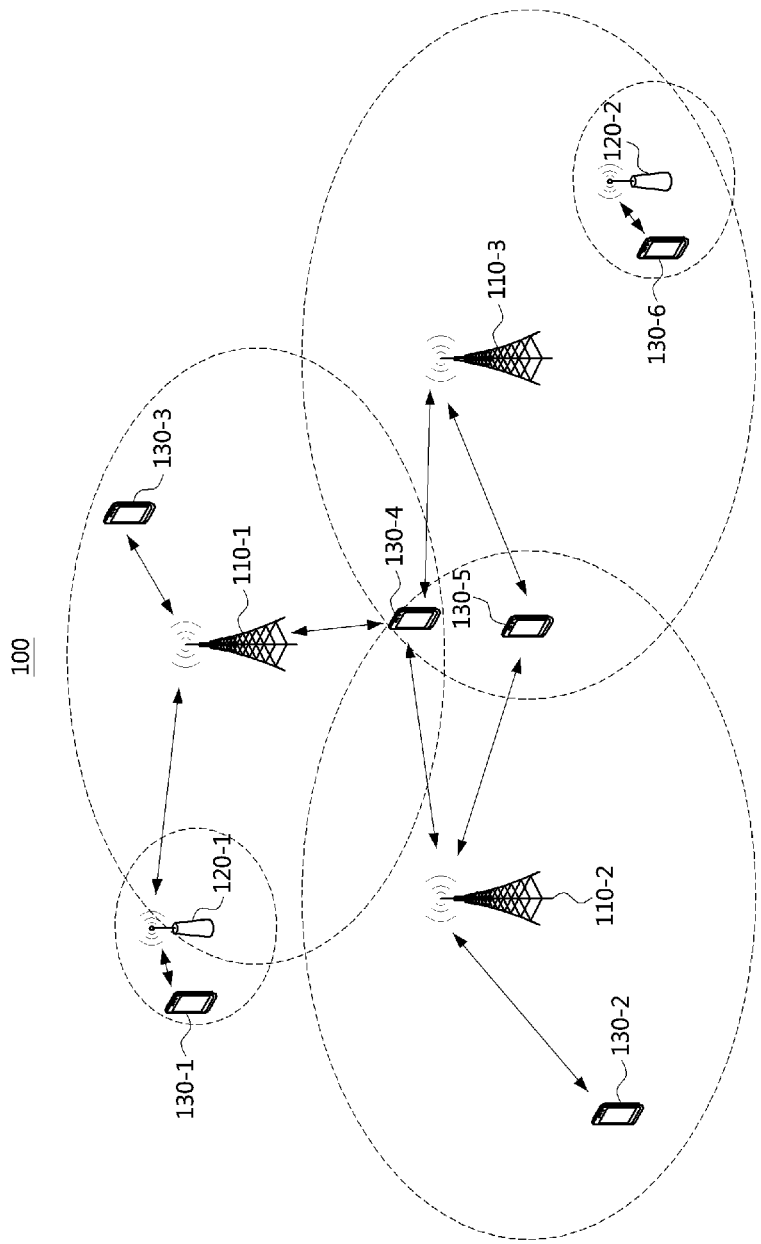
FIG. 1 is a conceptual diagram illustrating a first embodiment of a communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

Hereinafter, a communication system to which embodiments according to the present disclosure will be described. However, the communication systems to which embodiments according to the present disclosure are applied are not restricted to what will be described below. That is, the embodiments according to the present disclosure may be applied to various communication systems. Here, the term 'communication system' may be used with the same meaning as the term 'communication network'.

FIG. 1 is a conceptual diagram illustrating a first embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Also, the communication system 100 may further include a core network. The core network supporting 4G communication (e.g., long term evolution (LTE) and LTE-advanced (LTE-A)) may comprise a serving gateway (S-GW), a packet data network (PDN) gateway (P-GW), a mobility management entity (MME), and the like. The core network supporting 5G communication (e.g., new radio (NR)) may comprise a user plane function (UPF), an access and mobility management function (AMF), and the like. The S-GW may correspond to the UPF, and the MME may correspond to the AMF. Thus, in the embodiments described below, the S-GW may mean the UPF, the MME may mean the AMF, and the S-GW/MME may mean the UPF/AMF.

The plurality of communication nodes may support 4th generation (4G) communication (e.g., long term evolution (LTE), LTE-advanced (LTE-A)), 5th generation (5G) communication, or the like. The 4G communication may be performed in a frequency band below 6 gigahertz (GHz), and the 5G communication may be performed in a frequency band above 6 GHz. For example, for the 4G and 5G communications, the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a cyclic prefix OFDM (CP-OFDM) based communication protocol, a discrete Fourier transform spread OFDM (DFT-s-OFDM) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, and a space division multiple access (SDMA) based communication protocol. Each of the plurality of communication nodes may have the following structure.

Figure 2:
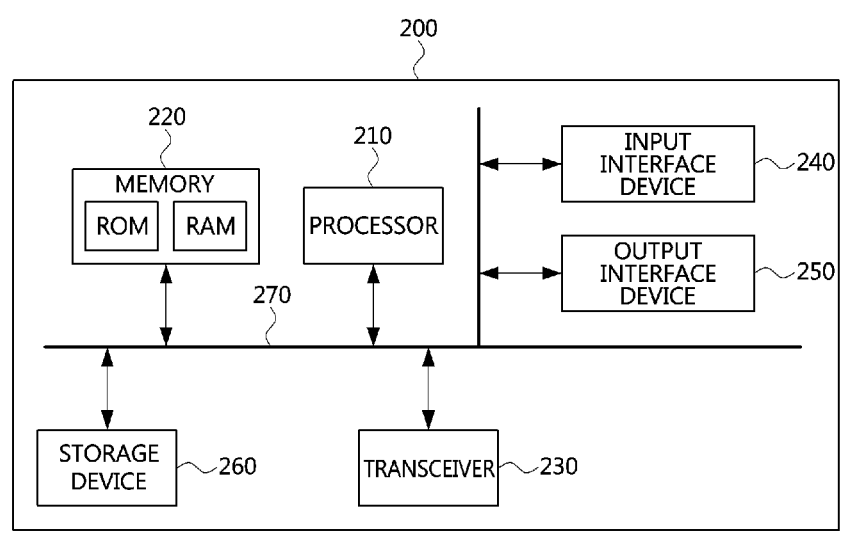
FIG. 2 is a block diagram illustrating a first embodiment of a communication node constituting a communication system.

FIG. 2 is a block diagram illustrating a first embodiment of a communication node constituting a cellular communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a gNB, an ng-eNB, a base transceiver station (BTS), a radio base station, a radio transceiver, an access point, an access node, a road side unit (RSU), a radio remote head (RRH), a transmission point (TP), a transmission and reception point (TRP), a flexible TRP (f-TRP), or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, a device supporting internet of things (IoT) functions, a mounted module/device/terminal, an on-board unit (OBU), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Meanwhile, in a communication system, a base station may perform all functions (e.g., remote radio transmission and reception function, baseband processing function, and the like) according to a communication protocol. Alternatively, the remote radio transmission and reception function among all the functions according to the communication protocol may be performed by a transmission reception point (TRP) (e.g., f-TRP), and the baseband processing function among all the functions according to the communication protocol may be performed by a baseband unit (BBU) block. The TRP may be a remote radio head (RRH), a radio unit (RU), a transmission point (TP), or the like. The BBU block may include at least one BBU or at least one digital unit (DU). The BBU block may be referred to as a 'BBU pool', a 'centralized BBU', or the like. The TRP may be connected to the BBU block via a wired fronthaul link or a wireless fronthaul link. A communication system composed of a backhaul link and a fronthaul link may be as follows. When a function-split technique of the communication protocol is applied, the TRP may selectively perform some functions of the BBU or some functions of a medium access control (MAC) or a radio link control (RLC) layer.

Figure 3:
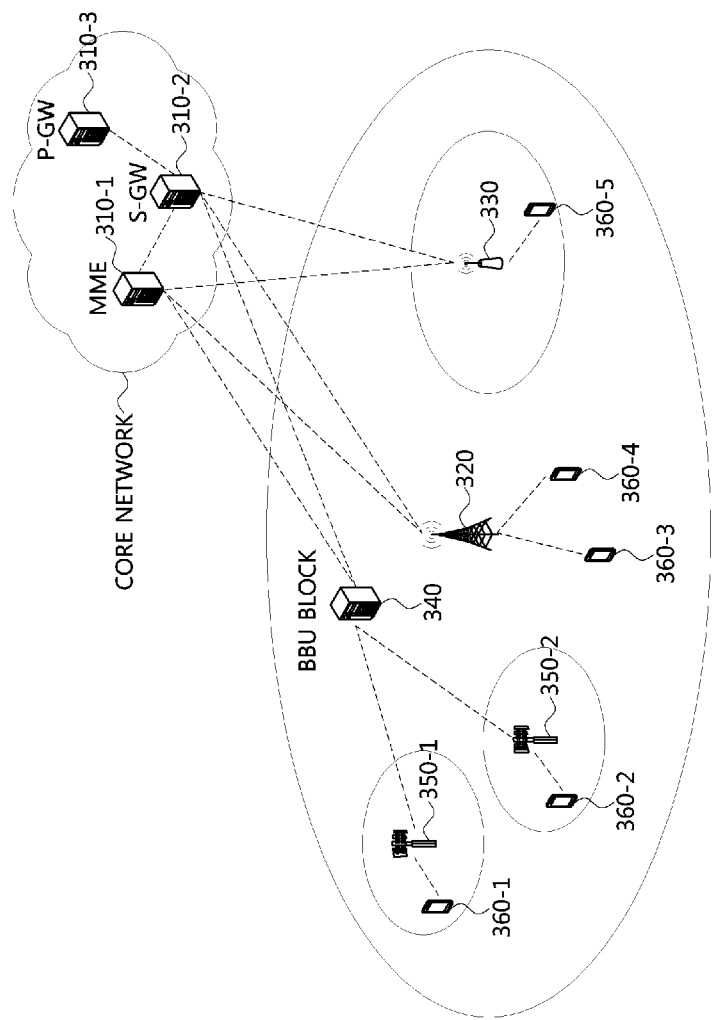
FIG. 3 is a conceptual diagram illustrating a second embodiment of a communication system.

FIG. 3 is a conceptual diagram illustrating a second embodiment of a communication system.

Referring to FIG. 3, a communication system may include a core network and an access network. The core network supporting the 4G communications may include an MME 310-1, an S-GW 310-2, a P-GW 310-3, and the like. The core network supporting the 5G communications may include AMF, UPF, or the like. The access network may include a macro base station 320, a small base station 330, TRPs 350-1 and 350-2, terminals 360-1, 360-2, 360-3, 360-4, and 360-5, and the like. The macro base station 320 or the small base station 330 may be connected with an end node of the core network via a wired backhaul. The TRPs 350-1 and 350-2 may support the remote radio transmission and reception function among all the functions according to the communication protocol, and the baseband processing functions for the TRPs 350-1 and 350-2 may be performed by the BBU block 340. The BBU block 340 may belong to the access network or the core network. The communication nodes (e.g., MME, S-GW, P-GW, AMF, UPF, macro base station, small base station, TRPs, terminals, and BBU block) belonging to the communication system may be configured identically or similarly to the communication node 200 shown in FIG. 2.

The macro base station 320 may be connected to the core network (e.g., MME 310-1, S-GW 310-2, AMF, UPF, or the like) using a wired backhaul link or a wireless backhaul link, and provide communication services to the terminals 360-3 and 360-4 based on a communication protocol (e.g., 4G communication protocol, 5G communication protocol). The small base station 330 may be connected to the core network (e.g., MME 310-1, S-GW 310-2, AMF, UPF, or the like) using a wired backhaul link or a wireless backhaul link, and may provide communication services to the terminal 360-5 based on a communication protocol (e.g., 4G communication protocol, 5G communication protocol).

The BBU block 340 may be located in the MME 310-1, the S-GW 310-2, AMF, UPF, or the macro base station 320. Alternatively, the BBU block 340 may be located independently of each the MME 310-1, the S-GW 310-2, AMF, UPF, and the macro base station 320. For example, the BBU block 340 may be configured as a logical function between the macro base station 320 and the MME 310-1 (or S-GW 310-2). The BBU block 340 may support the plurality of TRPs 350-1 and 350-2, and may be connected to each of the plurality of TRPs 350-1 and 350-2 using a wired fronthaul link or a wireless fronthaul link. That is, the link between the BBU block 340 and the TRPs 350-1 and 350-2 may be referred to as a 'fronthaul link'.

The first TRP 350-1 may be connected to the BBU block 340 via a wired fronthaul link or a wireless fronthaul link, and provide communication services to the first terminal 360-1 based on a communication protocol (e.g., 4G communication protocol, 5G communication protocol). The second TRP 350-2 may be connected to the BBU block 340 via a wired fronthaul link or a wireless fronthaul link, and provide communication services to the second terminal 360-2 based on a communication protocol (e.g., 4G communication protocol, 5G communication protocol).

In the embodiments to be described below, a communication system including an access network, an Xhaul network, and a core network may be referred to as an 'integrated communication system'. The communication nodes (e.g., MME, S-GW, P-GW, AMF, UPF, BBU block, Xhaul distributed unit (XDU), Xhaul control unit (XCU), base station, TRP, terminal, and the like) may be configured identically or similarly to the communication node 200 shown in FIG. 2. The communication nodes belonging to the Xhaul network may be connected using an Xhaul link, and the Xhaul link may be a backhaul link or a fronthaul link.

Also, the S-GW (or, UPF) of the integrated communication system may refer to an end communication node of the core network that exchanges packets (e.g., control information, data) with the base station, and the MME (or, AMF) of the integrated communication system may refer to a communication node in the core network that performs control functions for a wireless access section (or, interface) of the terminal. Here, each of the backhaul link, the fronthaul link, the Xhaul link, the XDU, the XCU, the BBU block, the S-GW, the MME, the AMF, and the UPF may be referred to as a different term according to a function (e.g., function of the Xhaul network, function of the core network) of a communication protocol depending on a radio access technology (RAT).

Figure 4:
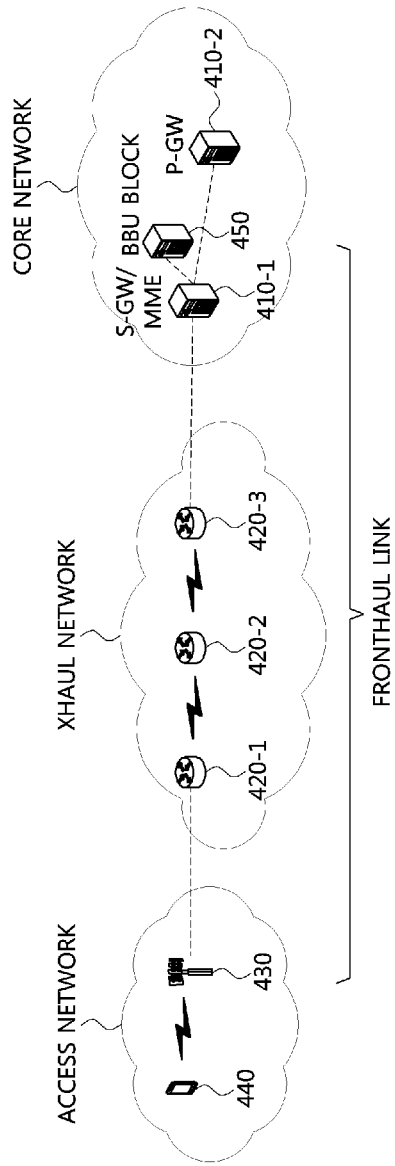
FIG. 4 is a conceptual diagram illustrating a first embodiment of an integrated communication system.

FIG. 4 is a conceptual diagram illustrating a first embodiment of an integrated communication system.

Referring to FIG. 4, the integrated communications system may include an access network, an Xhaul network, and a core network. The Xhaul network may be located between the access network and the core network, and may support communications between the access network and the core network. The communication nodes belonging to the integrated communication system may be configured to be the same as or similar to the communication node 200 shown in FIG. 2. The access network may include a TRP 430, a terminal 440, and the like. The Xhaul network may include a plurality of communication nodes 420-1, 420-2, and 420-3. The communication node constituting the Xhaul network may be referred to as an 'XDU'. In the Xhaul network, the XDUs 420-1, 420-2, and 420-3 may be connected using wireless Xhaul links and may be connected based on a multi-hop scheme. The core network may include an S-GW/MME 410-1 (or, UPF/AMF), a P-GW 410-2, and the like. The S-GW/MME 410-1 may refer to a communication node including an S-GW and an MME, and the UPF/AMF may refer to a communication node an UPF and an AMF. The BBU block 450 may be located in the S-GW/MME 410-1 and may be connected to the third XDU 420-3 via a wired link.

The first XDU 420-1 of the Xhaul network may be connected to the TRP 430 using a wired link. Alternatively, the first XDU 420-1 may be integrated into the TRP 430. The second XDU 420-2 may be connected to each of the first XDU 420-1 and the third XDU 420-3 using a wireless link (e.g., wireless Xhaul link), and the third XDU 420-3 may be connected to an end communication node (e.g., the S-GW/MME 410-1) of the core network using a wired link. Among the plurality of XDUs 420-1, 420-2, and 420-3 of the Xhaul network, an XDU connected to an end communication node of the core network may be referred to as an 'XDU aggregator'. That is, the third XDU 420-3 in the Xhaul network may be the XDU aggregator. The functions of the XDU aggregator may be performed by the S-GW/MME 410-1 in the core network.

The communications between the plurality of XDUs 420-1, 420-2 and 420-3 may be performed using a communication protocol for the Xhaul link (hereinafter, 'Xhaul protocol'), which is different from an access protocol (e.g., a communication protocol used for communications between the terminal 440 and the TRP 430 (or, macro base station, small base station)). Packets to which the Xhaul protocol is applied may be transmitted to each of the core network and the access network through the Xhaul link. Here, the packets may indicate control information, data, and the like.

The TRP 430 may provide communication services to the terminal 440 using an access protocol (e.g., 4G communication protocol, 5G communication protocol), and may be connected to the first XDU 420-1 using a wired link. The TRP 430 may support a remote radio transmission and reception function among all the functions according to the communication protocol, and the baseband processing function for the TRP 430 may be performed in the BBU block 450. A link (e.g., "TRP 430—first XDU 420-1—second XDU 420-2—third XDU 420-3—BBU block 450 (or, SGW/MME 410-1)") between the TRP 430 performing the remote radio transmission and reception function and the BBU block 450 performing the baseband processing function may be referred to as a 'fronthaul link'. For example, the fronthaul link may be configured differently depending on the location of the BBU block 450 performing the baseband processing function.

Figure 5:
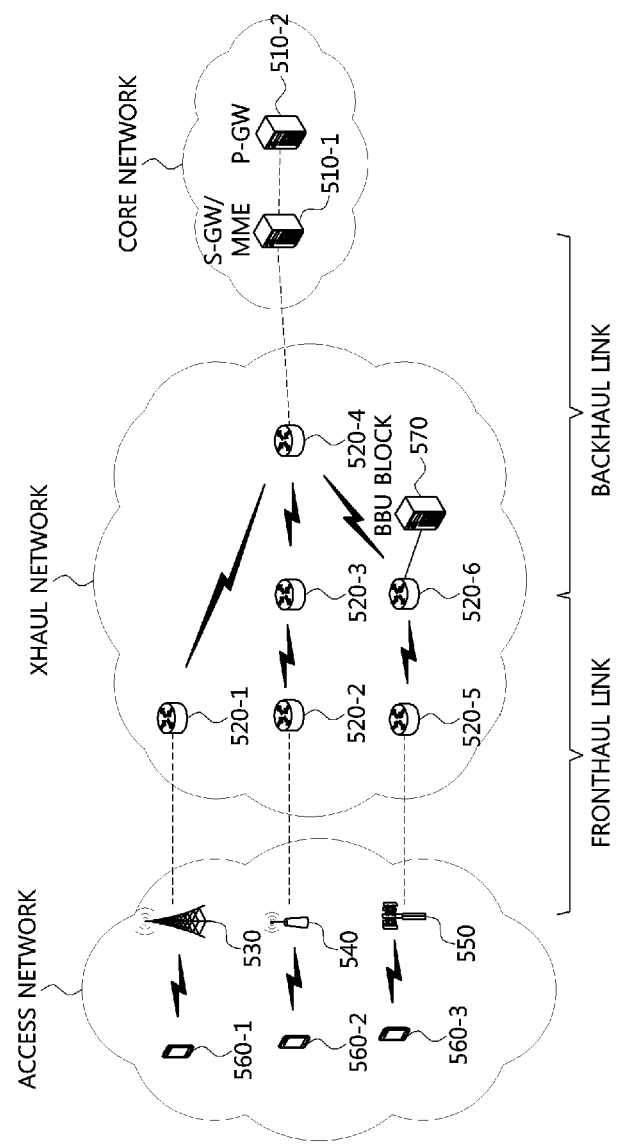
FIG. 5 is a conceptual diagram illustrating a second embodiment of an integrated communication system.

FIG. 5 is a conceptual diagram illustrating a second embodiment of an integrated communication system.

Referring to FIG. 5, the integrated communications system may include an access network, an Xhaul network, and a core network. The Xhaul network may be located between the access network and the core network, and may support communications between the access network and the core network. The communication nodes belonging to the integrated communication system may be configured to be the same as or similar to the communication node 200 shown in FIG. 2. The access network may include a macro base station 530, a small base station 540, a TRP 550, terminals 560-1, 560-2, and 560-3, and the like. The Xhaul network may include a plurality of communication nodes 520-1, 520-2, 520-3, 520-4, 520-5, and 520-6. The communication node constituting the Xhaul network may be referred to as an 'XDU'. In the Xhaul network, the XDUs 520-1, 520-2, 520-3, 520-4, 520-5, and 520-6 may be connected using wireless Xhaul links and may be connected based on a multi-hop scheme. A BBU block 570 may be located in one XDU among the plurality of XDUs 520-1, 520-2, 520-3, 520-4, 520-5, and 520-6. For example, the BBU block 570 may be located in the sixth XDU 520-6. The core network may include an S-GW/MME 510-1 (or, UPF/AMF), a P-GW 510-2, and the like. The S-GW/MME 510-1 may refer to a communication node including an S-GW and an MME. The S-GW/MME 410-1 may refer to a communication node including an S-GW and an MME, and the UPF/AMF may refer to a communication node an UPF and an AMF.

The first XDU 520-1 of the Xhaul network may be connected to the macro base station 530 using a wired link, or may be integrated into the macro base station 530. The second XDU 520-2 of the Xhaul network may be connected to the small base station 540 using a wired link, or may be integrated into the small base station 540. The fifth XDU 520-5 of the Xhaul network may be connected to the TRP 550 using a wired link, or may be integrated into the TRP 550.

The fourth XDU 520-4 may be connected to an end communication node (e.g., the S-GW/MME 510-1) of the core network using a wired link. Among the plurality of XDUs 520-1, 520-2, 520-3, 520-4, 520-5, and 520-6, an XDU connected to an end communication node of the core network may be referred to as an 'XDU aggregator'.

That is, the fourth XDU 520-4 may be the XDU aggregator. The communications between the plurality of XDUs 520-1, 520-2, 520-3, 520-4, 520-5, and 520-6 may be performed using the Xhaul protocol. Packets (e.g., data, control information) to which the Xhaul protocol is applied may be transmitted to each of the core network and the access network via the Xhaul link.

The macro base station 530 may provide communication services to the first terminal 560-1 using an access protocol (e.g., 4G communication protocol, 5G communication protocol), and may be connected to the first XDU 520-1 via a wired link. The macro base station 530 may be connected to the core network via the Xhaul network, and a link of "macro base station 530—first XDU 520-1—fourth XDU 520-4—S-GW/MME 510-1" may be referred to as a 'backhaul link'. The small base station 540 may provide communication services to the second terminal 560-2 using an access protocol (e.g., 4G communication protocol, 5G communication protocol), and may be connected to the second XDU 520-2 using a wired link. The small base station 540 may be connected to the core network via the Xhaul network, and a link of "small base station 540—second XDU 520-2—third XDU 520-3—fourth XDU 520-4—S-GW/MME 510-1" may be referred to as a 'backhaul link'.

The TRP 550 may provide communication services to the third terminal 560-3 using an access protocol (e.g., 4G communication protocol, 5G communication protocol), and may be connected to the fifth XDU 520-5 using a wired link. The TRP 550 may support a remote radio transmission and reception function among all the functions according to the communication protocol, and the baseband processing function for the TRP 550 may be performed in the BBU block 570. A link (e.g., a link of "TRP 550—fifth XDU 520-5—BBU block 570 (or, sixth XDU 520-6)") between the TRP 550 performing the remote radio transmission and reception function and the BBU block 570 performing the baseband processing function may be referred to as a 'fronthaul link', and a link (e.g., a link of "BBU block 570 (or, sixth XDU 520-6)—fourth XDU 520-4—S-GW/MME 510-1") between the BBU block 570 and the S-GW/MME 510-1 may be referred to as a 'backhaul link'. For example, the fronthaul link may be configured differently depending on the location of the BBU block 570 performing the baseband processing function.

Meanwhile, in the integrated communication system, a path configuration (or, path mapping, connection configuration, or connection mapping) between the XDUs may be completed for transmission and reception of packets (e.g., data, control information) between the XDUs. Here, the path configuration may be referred to as a 'path set', a 'path establishment', a 'path mapping', a 'route set', a 'route establishment', a 'route mapping', a 'route configuration procedure', or the like. The connection configuration may be referred to as a 'connection set', a 'connection establishment', or the like.

In an upper layer of the Xhaul protocol (e.g., an upper layer above the PHY layer), a transmission control protocol (TCP)/Internet protocol (IP), an Ethernet, a user datagram protocol (UDP)/real time protocol (RTP), a multiprotocol label switching (MPLS) protocol, a general packet radio service (GPRS) tunneling protocol (GTP), or a L2 layer switching (e.g., a method of applying labeling, a method of using a separate header field, etc.), or the like may be used.

The completed state of the path configuration among the XDUs may refer to a state in which packets (e.g., data or control information) can be transmitted and received in the path among the corresponding XDUs (e.g., a source XDU, one or more waypoint XDUs, a destination XDU, and the like) by using unique identifiers (e.g., IP address, label, information included in the header field, information included in control information, etc.).

The path configuration among the XDUs may be performed by the XDU or the XCU. For example, in the XDU or the XCU, a block (hereinafter referred to as 'PM function block' or 'RM function block') supporting a path management (PM) function or a routing management (RM) function may control a path configuration procedure a path release procedure, a path activation procedure, a path inactivation procedure, and the like.

The XCU may perform control management functions of the Xhaul network.

For example, the XCU may manage a topology of Xhaul network, manage paths in the Xhaul network, and control XDUs constituting the Xhaul network. The XCU may be directly connected to an XDU aggregator or a specific XDU. Also, the XCU may perform an information exchange operation and a control operation with the core network. The XCU may perform internal signaling operations and control operations with the function blocks in the communication nodes (e.g., XCU, XDU) constituting the Xhaul network in order to control the Xhaul network. The XCU may perform the PM function for path control and management in the Xhaul network, perform a mobility management (MINI) function for mobility control and management in the Xhaul network, and perform a load control (LC) function for load control and management for Xhaul links in the Xhaul network.

The PM function block may perform control and management functions for paths created or changed according to the control messages received from the XDU and the operations of the function blocks in the XCU. The PM function block may identify whether a path among the XDUs is established in the Xhaul network, and may manage path configuration information, a routing table, a flow table, and the like based on the identified result.

The MM function block may perform control procedures related to the mobility of the XDU, and may change the path configuration information, the routing table, the flow table, and the like in conjunction with the PM function block in order to change the path according to the mobility of the XDU. Also, the MM function block may perform control and management functions for measurement and reporting on the XDU in order to control the mobility of the XDU.

The XCU may create and manage XDU contexts for the respective XDUs for path, mobility and load control and management in the Xhaul network. The XDU context may be created when the corresponding XDU is attached (e.g., registered) to the integrated communication system (e.g., Xhaul network), and may be deleted when the corresponding XUD is detached (e.g., registration-released) from the integrated communication system (e.g., Xhaul network).

In the Xhaul network, the mobility support function may be used for a mobile device having XDU functionality. Here, the mobile device may be an unmanned aerial vehicle, a drone, an autonomous vehicle, a vehicle running on a navigation function, or the like. In the Xhaul network, the mobility support function may provide service continuity for the mobile XDUs. In the Xhaul network, the mobility support function may be used for a beam change between XDUs (e.g., sectors constituting XDUs) having different service areas (e.g., coverage), or used for an intra-frequency or inter-frequency XDU change. Since the Xhaul link requires higher transmission reliability than the access link (e.g., channel) for the terminal, mobility functions without service interruption or packet loss should be supported in the Xhaul network.

Figure 6:
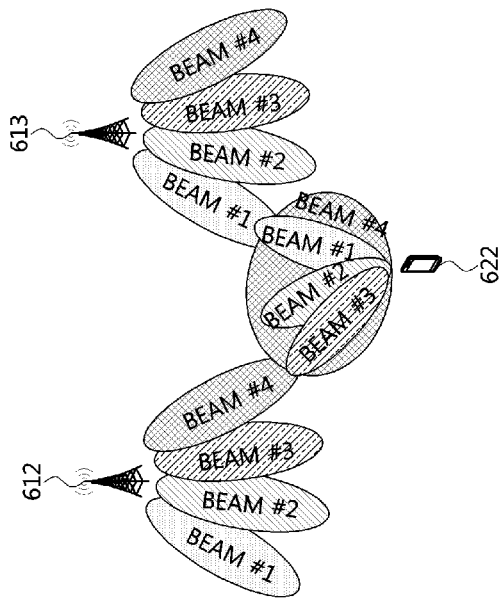
FIG. 6 is a conceptual illustrating a first embodiment of a beamforming-based communication method in a communication system.
Figure 6:
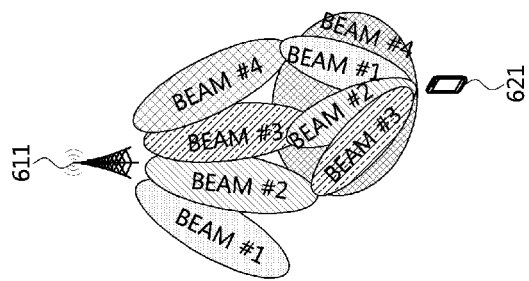

FIG. 6 is a conceptual illustrating a first embodiment of a beamforming-based communication method in a communication system.

Referring to FIG. 6, a communication system may include base stations 611, 612 and 613, terminals 621 and 622, and the like, and the communication nodes (e.g., base stations, terminals) may perform communications based on a beamforming scheme. For example, each of the base stations 611, 612 and 613 may communicate using a plurality of beams (e.g., beams #1 to #4), and each of the terminals 621 and 622 may also communicate using the plurality of beams (e.g., beams #1 to #4).

An operational state of the first terminal 621 may be a state in which a connection establishment with the first base station 611 is completed. For example, the operational state of the first terminal 621 may be a radio resource control (RRC) connected (RRC_CONNECTED) state or an RRC inactive (RRC_INACTIVE) state. Alternatively, the first terminal 621 may operate in an RRC idle (RRC_IDLE) state within a service area of the first base station 611. An operational state of the second terminal 622 may be a state in which a connection establishment with the second base station 612 or the third base station 613 is completed. For example, the operational state of the second terminal 622 may be an RRC_CONNECTED state or an RRC_INACTIVE state. Alternatively, the second terminal 622 may operate in an RRC_IDLE state within a service area of the second base station 612 or the third base station 613.

The base stations 611, 612 and 613 may support mobility functions and thus the mobility of the terminals 621 and 622 may be ensured between the base stations 611, 612 and 613. Signals received from the terminals 621 and 622 may be used by the base stations 611, 612, and 613 to select an optimal beam.

In a communication system supporting a high frequency band, a function (e.g., a mobility support function and a radio resource management function) of changing a configured beam of the first terminal 621 at the first base station 611 may be considered, and a function (e.g., a mobility support function and a radio resource management function) of changing a configured beam of the second terminal 622 between the second base station 612 and the third base station 613 may be considered. Here, the configured beam may be a serving beam.

For example, in the case that the beam #3 of the first base station 611 is paired with the beam #2 of the first terminal 621, the beam #3 of the first base station 611 paired with the beam #2 of the first terminal 621 may be changed to another beam (e.g., the beam #2 or #4 of the first base station 611) according to a quality change of a radio channel between the first base station 611 and the first terminal 621. Alternatively, the beam #2 of the first terminal 621 paired with the beam #3 of the first base station 611 may be changed to another beam (e.g., the beam #1, #3, or #4 of the first terminal 621).

Meanwhile, in the case that the beam #4 of the second base station 612 is paired with the beam #3 of the second terminal 622, a handover procedure for changing the configured beam of the second terminal 622 may be performed between the second base station 612 and the third base station 613 according to a quality change of a radio channel between the second base station 612 and the second terminal 622.

In order to perform the mobility support function and the radio resource management function (e.g., handover procedure), the base stations 611, 612 and 613 may transmit synchronization signals or reference signals, and the terminals 621 and 622 may perform search and monitoring on the base stations 611, 612 and 613 (e.g., beams of the base stations 611, 612, and 613) using the synchronization signals or the reference signals received from the base stations 611, 612, and 613. Here, each of the synchronization signals may be a primary synchronization signal (PSS), a secondary synchronization signal (SSS), a synchronization signal/ physical broadcast channel (SS/PBCH) block, or the like. Each of the reference signals may be a cell-specific reference signal (CRS), a demodulation reference signal (DMRS), a channel state information-reference signal (CSI-RS), a tracking reference signal (TRS), or the like.

The communication system may support numerologies defined in Table 1 below and the base stations 611,612 and 613 may provide synchronization signals or reference signals according to a default numerology (e.g., $\mu=0$). Accordingly, the terminals 621 and 622 may assume that the default numerology (e.g., $\mu=0$) is used, and perform search and monitoring on the synchronization signals and reference signals according to the default numerology (e.g., $\mu=0$).

TABLE 1

| $\mu$ | Subcarrier spacing ($\Delta f = 2^\mu \cdot 15$ kHz) | Type of Cyclic Prefix (CP) |
|---|---|---|
| 0 | 15 kHz | Normal |
| 1 | 30 kHz | Normal |
| 2 | 60 kHz | Normal or Extended |
| 3 | 120 kHz | Normal |
| 4 | 240 kHz | Normal |
| 5 | 480 kHz | Normal |

Here, the default numerology may be a frame format applied to a radio resource in which a user equipment (UE) common search space is configured, a frame format applied to a radio resource in which a control resource set (CORESET) of a NR system is configured, a frame format applied to a radio resource through which a burst of SS/PBCH blocks (e.g., SS burst) are transmitted, or the like.

Meanwhile, the terminals 621 and 622 connected to the base stations 611, 612 and 613 may transmit uplink-dedicated reference signals (e.g., sounding reference signal (SRS)) in uplink resources assigned by the base stations 611, 612 and 623. Alternatively, the terminals 621 and 622 connected to the base stations 611, 612 and 613 may receive downlink-dedicated reference signals configured by the base stations 611, 612 and 623.

For example, in order for the first terminal 621 located in the service area of the first base station 611 to search for the first base station 611, and perform a synchronization acquisition operation, a beam configuration operation, a radio link monitoring operation, or the like, the first base station 611 may transmit synchronization signals and reference signals. The first terminal 621 connected to the first base station 611 may receive physical layer (e.g., PHY layer) radio resource configuration information for connection establishment and radio resource management from the first base station 611 (e.g., serving base station).

Here, the PHY layer radio resource configuration information may be parameters in an RRC message. For example, in the LTE system, the parameters included in the RRC message may be PhysicalConfigDedicated, PUCCH-Config, RACH-ConfigCommon, RACH-ConfigDedicated, RadioResourceConfigCommon, RadioResourceConfigDedicated, and the like.

The PHY layer radio resource configuration information may include a channel/signal/resource configuration cycle (e.g., allocation cycle) according to a frame format of the base station (e.g., a numerology supported by the base station), time-frequency position information of a radio resource for transmission and reception of a channel or signal, a transmission time (e.g., allocation time) of the radio resource for transmission and reception of the channel or signal, and the like. Here, the frame format may indicate a subframe having a length according to the numerology (e.g., subcarrier spacing).

For example, in a radio frame (e.g., a radio frame having the length of 10 milliseconds (ms)), the numbers of symbols constituting a subframe, a slot, and a mini-slot may be different. For example, the length of each subframe may be 1 ms, and each slot may include 14 symbols. Meanwhile, each mini-slot may have 2, 4, or 7 symbols.

- Transmission frequency information and frame format information of a base station
  - Transmission frequency information: all transmission carriers (e.g., transmission frequency for a unit cell) or bandwidth parts (BWPs) supported by the base station, a transmission time reference or a time difference (e.g., a transmission cycle or an offset parameter indicating a transmission time reference (or, time difference) between the synchronization signals) between the transmission frequencies supported by the base station, and the like.
  - Frame format information: configuration parameters for the subframe, slot, and mini-slot configured according to a subcarrier spacing.
- Configuration information of downlink reference signals (e.g., CSI-RS, common-RS, and the like)
  - Transmission cycle, transmission positions, code sequence, masking sequence, scrambling sequence, etc. of reference signals (e.g., common-RS) commonly applied to a coverage of the base station (or, beam), and the like.
- Configuration information of uplink reference signals and control signals
  - Configuration information of SRS, configuration information of reference signals for uplink beam sweeping, configuration information of reference signals for uplink beam monitoring, configuration information of radio resources (or, preamble) for grant-free uplink transmissions, and the like.
- Configuration information of physical downlink control channel (PDCCH)
  - Configuration information of reference signals for demodulation of PDCCH, configuration information of beam-common reference signals (e.g., reference signals that all terminals belonging to a beam coverage are able to receive), configuration information of reference signals for beam sweeping, configuration information of reference signals for channel estimation, and the like.
- Configuration information of physical uplink control channel (PUCCH)
- Configuration information of resources for transmitting and receiving a scheduling request (SR).
- Configuration information of resources for transmitting and receiving hybrid automatic repeat request (HARD) responses (e.g., acknowledgement (ACK) or negative ACK (NACK)).
- The number of antenna ports, information on an arrangement of antennas, beam configuration or beam index mapping information for beamforming.
- Configuration information of downlink and uplink signals and resources for beam sweeping.
- Configuration information of a beam configuration operation, a beam recovery operation, a beam reconfiguration operation, a radio link re-establishment operation, a beam switching operation within a same base station, triggering signals for a handover operation for beam switching between base stations, timers for controlling the above-described operations, and the like.

The configuration information and parameters described above may be configured to be applied to the frame formats according to the numerologies defined in Table 1.

In the following embodiments, "Resource-Config information" may be a control message (e.g., RRC message) including one or more pieces of the configuration information (e.g., parameters) among the above-described PHY layer radio resource configuration information. The "Resource-Config information" may be commonly applied to the entire coverage (e.g., beam coverage) of the base station. Alternatively, the "Resource-Config information" may be configuration information dedicated to a specific terminal or a specific terminal group. The configuration information included in the "Resource-Config information" may be configured as a single control message. Alternatively, the configuration information included in the "Resource-Config information" may be configured as a plurality of control messages according to attributes of the corresponding configuration information. Beam index information may indicate at least one of a transmission beam index and a reception beam index.

Thus, a communication service for the first terminal 621 connected to the first base station 611 may be provided through the configured beam of the first base station 611. In the case that the beam #3 of the first base station 611 is paired with the beam #2 of the first terminal 621, the first terminal 621 may use at least one of the synchronization signals transmitted from the first base station 611 and the reference signals transmitted through the beam #3 of the first base station 611 to search for or monitor a downlink radio channel (e.g., downlink radio link). The monitoring operation on the downlink radio channel (e.g., downlink radio link) may refer to a radio link monitoring (RLM), and the first terminal 621 may detect a problem of the radio link by performing the RLM.

Here, the detection of the problem of the radio link may mean that the synchronization of the PHY layer is not maintained in the corresponding radio link. For example, the first terminal 621 may determine that a radio link problem has occurred when the synchronization between the first base station 611 and the first terminal 621 is not maintained for a preset time. When the radio link problem is detected, the first terminal 621 may perform a recovery operation on the corresponding radio link. When the recovery operation on the radio link fails, the first terminal 621 may declare a radio link failure (RLF) and perform a radio link re-establishment operation.

The radio link problem detection operation, the radio link recovery operation, the RLF declaration operation, the radio link re-establishment operation, and the like may be performed by layers belonging to the communication node. The layers belonging to the communication node may include a layer 1 (e.g., PHY layer), a layer 2 (e.g., a medium access control (MAC) layer, a radio link control (RLC) layer, a packet data convergence protocol (PDCP) layer), a layer 3 (e.g., an RRC layer), and the like.

The PHY layer of the terminal may monitor the radio link by receiving at least one of the synchronization signals and the reference signals. Here, each of the reference signals may be a common reference signal of the base station, a beam common reference signal, a dedicated reference signal assigned to a terminal or a specific terminal group, or the like. The common reference signal may be a reference signal that can be received by all the terminals located within the coverage of the base station or within the coverage of the beam, and the terminal may estimate the radio channel using the common reference signal. The dedicated reference signal may be a reference signal that can be received by a specific terminal (or a terminal belonging to a specific terminal group) located within the coverage of the base station or the coverage of the beam, and the specific terminal (or, the terminal belonging to the specific terminal group) may estimate the radio channel using the dedicated reference signal. Therefore, when the base station is changed or the configured beam is changed, a procedure of changing the configuration information (e.g., parameters) of the dedicated reference signal between the terminal and the base station may be performed. The configuration information of the common reference signal may be transmitted through system information (e.g., physical broadcast channel (PBCH)), and in this case, the terminal may identify the configuration information of the common reference signal included in the system information received from the base station. In the handover procedure, the configuration information of the common reference signal may be transmitted through a dedicated control message (e.g., RRC message), and in this case, the terminal may identify the configuration information of the common reference signal indicated by the dedicated control message received from the base station.

In order to ensure service continuity, the base station may allocate multiple beams to the terminal. Referring to FIG. 6, the first base station 611 may allocate the beams #2 to #4 to the first terminal 621, and the second base station 612 may allocate the beams #3 to #4 to the second terminal 621. The state in which the beams are allocated may refer to a state in which a transmission beam of the base station and a reception beam of the terminal are determined (e.g., a state in which a beam pairing is completed), and transmission and receptions operations for data and control information may be possible in the state in which the beams are determined.

Alternatively, the operation of allocating the beams may mean an operation of configuring beams so that the terminal can perform a beam sweeping operation or a beam measurement and report operation.

The plurality of beams may be allocated in consideration of a movement speed of the terminal, a movement direction of the terminal, a position of the terminal, a quality of the radio link or channel, beam qualities, beam interferences, or the like. For example, when the movement speed of the first terminal 621 is less than or equal to a preset threshold value, the first base station 611 may allocate the adjacent beams #2 to #3 to the first terminal 621. On the other hand, when the movement speed of the first terminal 621 exceeds the preset threshold value, the first base station 611 may allocate, to the first terminal 621, the beams #2 and #4 spaced apart from each other.

In the case that the second terminal 622 moves from the coverage of the second base station 612 to the coverage of the third base station 613 while a communication service for the second terminal 622 is provided through the beams #3 to #4 allocated by the second base station 612, and a cell (or, sector) to which the second base station 612 belongs is different from a cell (or, sector) to which the third base station 613 belongs, a handover procedure between the second base station 612 and the third base station 613 may be performed.

When the handover procedure is performed, configuration information of the beams #1 to #2 of the third base station 613 may be transmitted from the third base station 613 to the second base station 612, and the second base station 612 may transmit to the second terminal 622 a handover control message including the configuration information of the beams #1 to #2 of the third base station 613. The configuration information may include beam index information (e.g., index of transmission beam, and index of reception beam) configured according to results of the beam sweeping operation or beam measurements, configuration information of the beams (e.g., transmission power, beam width, beam vertical angle, beam horizontal angle, etc.), transmission and reception timing information of the beams (e.g., index or offset in units of subframes, slots, mini-slots, or symbols), configuration information of reference signals transmitted through the beams (e.g., sequence, index, etc.), and the like.

A control message including the above-described information required for beam allocation may be transmitted among the second base station 612, the third base station 613, and the second terminal 622 in order to allocate a plurality of beams to the second terminal 622.

On the other hand, in the case that the second terminal 622 moves from the coverage of the second base station 612 to the coverage of the third base station 613 while the communication service for the second terminal 622 is provided through the beams #3 to #4 allocated by the second base station 612, and the second base station 612 and the third base station 613 belong to a same cell (or, sector), a procedure for changing a transmission communication node (e.g., base station) within the cell may be performed.

In this case, the second base station 612 and the third base station 613 may be communication nodes (e.g., RRH, RTP, etc.) to which a function split is applied. For example, each of the second base station 612 and the third base station 613 may support at least one of a PHY layer function, a MAC layer function, a RLC layer function, a PDCP layer function, and an adaptation layer. Here, the adaptation layer may be a layer higher than the PDCP layer, and may include a mapping function between a quality of service (QoS) flow and a data radio bearer (DRB), a marking function of a QoS flow identifier for a downlink packet or an uplink packet, and the like.

When the base stations 612 and 613 belonging to the same cell include some layers (e.g., layers 1 and 2), the procedure for changing the transmission node from the second base station 612 to the third base station 613 may be performed through exchanges of MAC messages (e.g., MAC control element (CE), control protocol data unit (PDU), etc.) without exchanging the RRC messages.

The layer responsible for generation, transmission, and reception of the control messages for changing the base stations may be determined according to the layers included in the corresponding base stations. For example, when each of the second base station 612 and the third base station 613 includes a PHY layer to a MAC layer (or a PHY layer to an RLC layer), the control message for changing the base station may be generated, transmitted, and received at a layer higher than the MAC layer (or, RLC layer). In the procedure for changing the base stations, the MAC layer (or the MAC layer and the RLC layer) of each of the base stations 612 and 613 and the second terminal 622 may be newly configured after being reset.

On the other hand, when each of the second base station 612 and the third base station 613 includes only a PHY layer, or when each of the second base station 612 and the third base station 613 supports only some of the functions of the MAC layer, the control messages for changing the base stations may be generated, transmitted, and received at the MAC layer. In this case, in the procedure for changing the base stations, the MAC layer of each of the base stations 612 and 613 and the second terminal 622 may not be reset.

In the procedure for changing the base stations, identification information of the base station may be transmitted to the terminal through an RRC message, a MAC layer control message (i.e., MAC control message), or a PHY layer control channel (e.g., downlink control information (DCI)). The identification information of the base station may be an identifier, configuration information of at least one reference signal, configuration information of at least one allocated beam, or the like. The configuration information of at least one reference signal may be at least one of resource allocation information, sequence information, and index information for the reference signal configured for each base station. Alternatively, the configuration information of at least one reference signal may be at least one of resource allocation information, sequence information, and index information for the reference signal configured for each specific terminal (or, specific terminal group).

The allocated beam may be a configured beam, a serving beam, or the like. The configuration information of at least one allocated beam may include at least one of a transmission power of the beam, a width of the beam, a vertical angle of the beam, a horizontal angle of the beam, transmission and reception timing information of the beam (e.g., index or offset in units of subframes, slots, mini-slots, or symbols), configuration information of reference signals transmitted through the beams (e.g., sequence, index, etc.), and the like.

Accordingly, the terminal may obtain the identification information of the base station from the RRC message, the MAC control message, or the PHY layer control channel, and may identify a base station with which the terminal is to perform a beam sweeping operation, a radio access operation, a transmission and reception operation of control information and data, and the like.

In the case that a plurality of beams are allocated, communications between the base station and the terminal may be performed using the plurality of allocated beams. In this case, the number of downlink beams may be the same as the number of uplink beams. Alternatively, the number of downlink beams may be different from the number of uplink beams. For example, the number of downlink beams may be two or more, and the number of uplink beams may be one. Alternatively, in the case that a plurality of beams are allocated, the communications between the base station and the terminal may be performed using one or more beams among the plurality of allocated beams, and the remaining beams not used for the communications may be configured as 'reserved beams' (e.g., candidate beams). For example, the plurality of beams may be configured as a primary beam, a secondary beam, or one or more reserved beams (e.g., candidate beams).

For example, the primary beam may be used for transmitting and receiving data and control information, and the secondary beam may be used for transmitting and receiving data. The signaling of the control information over the secondary beam may be restricted for each layer (e.g., layer 1, layer 2, or layer 3). Alternatively, the signaling of the control information over the secondary beam may be partially restricted according to each function within the layer. Alternatively, the signaling of the control information over the secondary beam may be restricted depending on the type of the control messages. The control messages may be classified according to a discontinuous reception (DRX) or discontinuous transmission (DRX) operation, a retransmission operation, a connection configuration and management operation, a measurement and report operation, a paging operation, an access operation, or the like.

Transmission and reception of data and control information over the reserved beam (e.g., candidate beam) may be restricted. The reserved beam (e.g., candidate beam) may be used for the beam sweeping operation or the beam measurement and report operation. In this case, the terminal may report the measurement result of the reserved beam to the base station using the primary beam or the secondary beam. The measurement and report operation for the reserved beam may be performed based on preset parameters. For example, the measurement and report operation for the reserved beam may be performed periodically or aperiodically according to determination of the terminal or when a specific event is generated. Each of the measurement result on the reserved beam and the result of the beam sweeping for the reserved beam may be transmitted through a PHY layer control channel (e.g., PUCCH) or a MAC control message (e.g., MAC control PDU). Here, the result of the beam sweeping may be a measurement result for one or more beams (or, beam group).

The base station may receive the beam measurement result or the beam sweeping result from the terminal, and may change properties (e.g., primary beam, secondary beam, reserved beam, active beam, inactive beam, or the like) of the beams. A beam (e.g., primary beam or secondary beam) that is capable of transmitting and receiving at least one among data and control information may be referred to as an active beam or a serving beam. A beam (e.g., reserved beam or candidate beam) that is not capable of transmitting and receiving data and control information may be referred to as an inactive beam or a neighbor beam.

A procedure for changing the beam property may be controlled in the MAC layer or the RRC layer. When the procedure for changing the beam property is performed in the MAC layer, the MAC layer may transmit information indicating that the beam property has been changed to an upper layer (e.g., the RRC layer). Also, the information indicating that the beam property has been changed may be transmitted from the base station to the terminal through a MAC control message or a PHY layer control channel (e.g., PDCCH). When the PHY layer control channel is used, the information indicating that the beam property has been changed may be included in a DCI, an uplink control information (UCI), or a separate field (e.g., an indicator).

The terminal may transmit to the base station information requesting a change of the beam property based on the beam measurement result or the beam sweeping result. The information requesting the change of the beam property may be transmitted through a PHY layer control channel, a MAC control message or an RRC message. Here, each of the PHY layer control channel, the MAC control message, and the RRC message may include one or more pieces of the configuration information of at least one allocated beam described above.

According to the above-described procedure for changing the beam property, the beam property may be changed as follows.

active beam→inactive beam
inactive beam→active beam
primary beam→secondary beam
secondary beam→primary beam
primary beam→reserved beam (e.g., candidate beam)
reserved beam (e.g., candidate beam)→primary beam
secondary beam→reserved beam (e.g., candidate beam)
reserved beam (e.g., candidate beam)→secondary beam The procedure for changing beam property may be performed in a MAC layer or an RRC layer. The procedure for changing beam property may be performed through cooperation between the MAC layer and the RRC layer when necessary.

When a plurality of beams are allocated, a beam used for transmission and reception of a PHY layer control channel may be configured among the plurality of beams. For example, the PHY layer control channel may be configured to be transmitted and received using a plurality of beams (e.g., primary beam and secondary beam). Alternatively, the PHY layer control channel may be configured to be transmitted and received using a primary beam among the plurality of beams.

The PHY layer control channel may be a PDCCH or a PUCCH. The PHY layer control channel may be used for transmission of at least one of scheduling information including resource allocation information (e.g., resource element (RE) allocation information and modulation and coding scheme (MCS) information), a channel quality indicator (CQI), a precoding matrix indicator (PMI), a HARQ response (e.g., ACK/NACK), resource request information (e.g., scheduling request (SR)), a beam sweeping result for supporting beamforming (e.g., beam indexes), and a measurement result on active beams and inactive beams.

In the case that a plurality of beams are allocated, configuration information of the plurality of beams (e.g., beam indexes, an interval between the allocated beams, information indicating whether contiguous beams are allocated, or the like) may be transmitted and received through a signaling procedure between the base station and the terminal.

The signaling procedure for transmitting and receiving the configuration information of the plurality of beams may be performed differently according to mobility information (e.g., movement speed, movement direction, position, etc.) of the terminal and quality information of the radio channel. The mobility information of the terminal and the quality information of the radio channel may be reported from the terminal to the base station. Alternatively, the mobility information of the terminal and the quality information of the radio channel may be acquired by the base station without the reporting of the terminal. The quality information of the radio channel may include at least one of a channel state indicator (CSI), a received signal strength indicator (RSSI), a reference signal received power (RSRP), and a reference signal received quality (RSRQ).

In the above-described embodiments, the radio resource allocation information may include a frequency parameter indicating a radio resource allocated in the frequency axis and a time parameter indicating a radio resource allocated in the time axis. The frequency parameter may indicate at least one of a center frequency, a system bandwidth, a bandwidth part, and a subcarrier. The time parameter may indicate at least one of a radio frame, a subframe, a transmission time interval (TTI), a slot, a mini-slot, a symbol, transmission time information (e.g., cycle, duration, window), and reception time information (e.g., cycle, duration, window).

Also, the radio resource allocation information may include a hopping pattern of radio resources, configuration information of beamforming (e.g., transmission power, beam width, beam vertical angle, beam horizontal angle, beam index, etc.), a code sequence (e.g., bit string, signal string), and the like. The type of the radio resource (e.g., the type of the PHY layer channel or the type of the transport channel) may vary according to the type (e.g., attribute) of control information, the type of data, a transmission direction (e.g., uplink or downlink), a communication scheme (e.g., sidelink communication), and the like.

Figure 7:
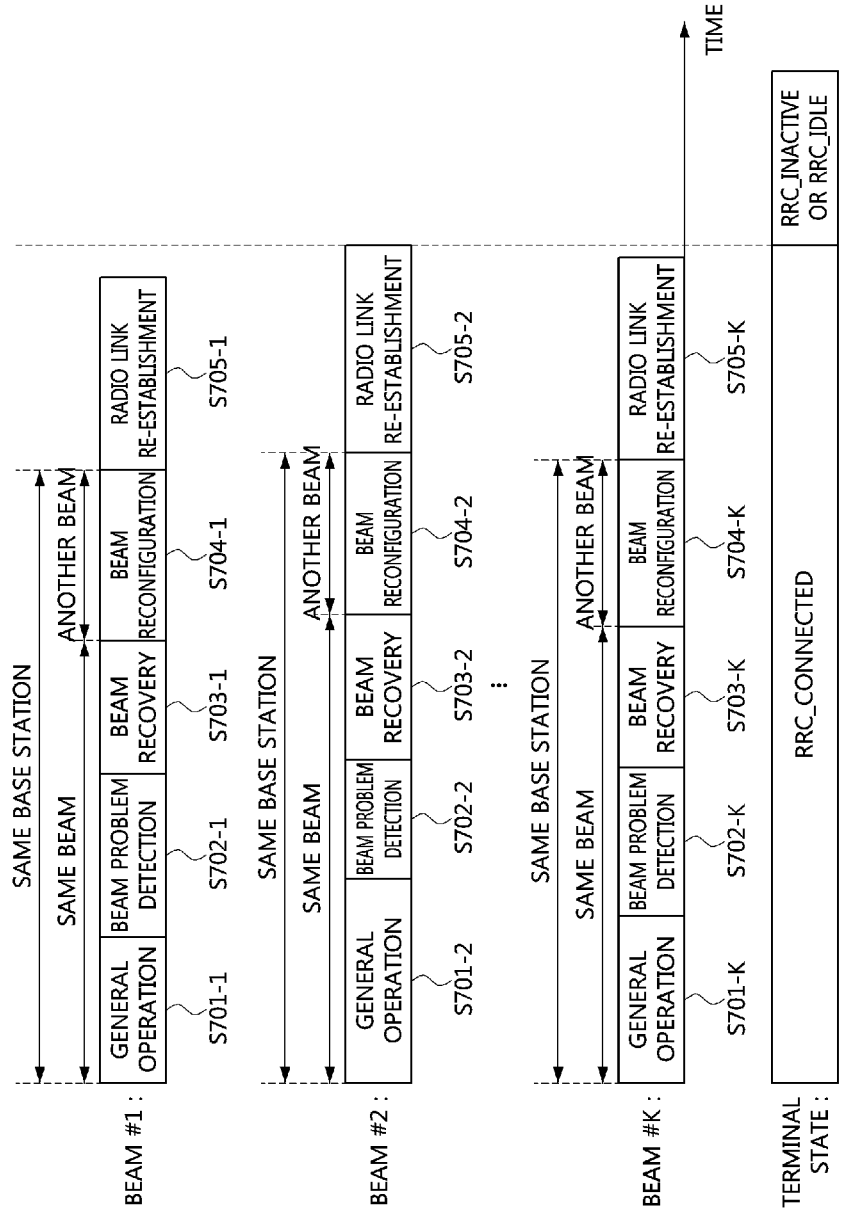
FIG. 7 is a timing diagram illustrating a first embodiment of a beam management procedure in a communication system.

FIG. 7 is a timing diagram illustrating a first embodiment of a beam management procedure in a communication system.

Referring to FIG. 7, a communication system may include base stations (e.g., the base stations 611, 612 and 613 shown in FIG. 6), terminals (e.g., terminals 621 and 622 shown in FIG. 6), and the like. The communications between the base station and the terminal may be performed based on a beamforming scheme. In the following embodiments, a beam monitoring operation may be performed by the base station or the terminal. For example, in the beam monitoring operation, the base station or the terminal may measure a received signal quality for a plurality of beams (e.g., a plurality of beams including a serving beam), and identify the plurality of beams based on results of the measurement.

Also, the beam monitoring operation may be performed using synchronization signals or reference signals configured in accordance with the default numerology. Alternatively, the beam monitoring operation may be performed using synchronization signals or reference signals configured according to a different numerology other than the default numerology. In this case, the base station may notify the terminal of the numerology (e.g., μ defined in Table 1) for the beam monitoring operation.

A beam or radio link management operation may include a beam problem detection (BPD) step (e.g., a beam monitoring step) S702, a beam recovery (BR) step S703, a beam reconfiguration step (e.g., a beam re-sweeping step) S704, and a radio link re-establishment step S705. Alternatively, the beam recovery step and the beam reconfiguration step may be configured as a single step. In this case, the beam or radio link management operation may include a beam problem detection step, a beam recovery and reconfiguration step, and a radio link re-establishment step. Each of the steps constituting the beam or radio link management operation may be controlled by the MAC layer or the RRC layer.

The communications between the base station and the terminal may be performed using one or more beams (e.g., beam #1, beam #2, . . . , beam #K). Here, K may be a positive integer. In a general operation step S701, a synchronization configuration and management operation for the beam configured between the base station and the terminal may be performed. For example, the PHY layer of the terminal may determine whether the synchronization of the PHY layer is maintained or not by monitoring at least one of the synchronization signal and the reference signal from the base station, and transmit a result of the determination to an upper layer (e.g., MAC layer, RRC layer, or the like) of the terminal.

In the case that the synchronization with the base station is maintained during a monitoring period, the PHY layer of the terminal may transmit an in-synch indicator (hereinafter referred to as 'IS_Ind') indicating that the synchronization is maintained to the upper layer of the terminal. On the other hand, in the case that the synchronization with the base station is not maintained during the monitoring period, the PHY layer of the terminal may transmit an out-of-synch indicator (hereinafter referred to as 'OoS_Ind') indicating that the synchronization is not maintained to the upper layer of the terminal.

Upon receiving the IS_Ind or the OoS_Ind is received from the PHY layer of the terminal, the upper layer (e.g., MAC layer, RRC layer) of the terminal may count the number of consecutively received IS_Inds or OoS_Inds, and may determine whether a downlink synchronization is maintained or not based on the number of the received IS_Inds or QoS_Inds. Alternatively, the terminal may determine whether a downlink synchronization is maintained or not based on a timer.

For example, if the IS_Ind is not received within a predetermined time from the reception of the OoS_Ind, the upper layer of the terminal may determine that the downlink synchronization is not maintained. In the case that it is determined that the downlink synchronization is not maintained based on the IS_Ind or the OoS_Ind, the terminal may determine that a beam problem is detected (S702). Alternatively, in the beam problem detection step S702, the beam problem may be detected based on a quality of a downlink signal (e.g., RSRP, RSRQ, etc.) or an error rate of a downlink channel (e.g., bit error rate (BER), block error rate (BLER), etc.).

In the case that the quality of the downlink signal is used to detect the beam problem, a reference value for the quality of the downlink signal may be preconfigured, and when the quality of the downlink signal measured in the monitoring period is less than the reference value, it may be determined that the beam problem is detected. Alternatively, in the case that the error rate of the downlink channel (e.g., PDCCH, physical downlink shared channel (PDSCH), etc.) is used to the beam problem, a reference value for the error rate of the downlink channel may be preconfigured, and when the error rate of the downlink channel measured in the monitoring period is not less than the reference value, it may be determined that the beam problem is detected. That is, the error rate of the downlink channel may be measured based on whether reception of PDCCH or PDSCH is successful in the monitoring period. Here, the reference value used for detecting the beam problem may be signaled from the base station to the terminal.

In particular, the error rate of the PDCCH may be measured based on a cyclic redundancy check (CRC) result for the PDCCH of the serving beam, a reception error rate of information mapped to a predetermined region in a radio resource allocated for the PDCCH, a reception error rate of a specific field (e.g., a specific parameter) constituting the PDCCH, or the like. Alternatively, an error rate of an UE-common search space, an error rate of an UE-specific search space, or an error rate of the UE-common search space and the UE-specific search space may be used as the error rate of the PDCCH. Alternatively, an error rate of the CORESET may be used as the error rate of the PDCCH.

Accordingly, the PHY layer of the terminal may transmit information indicating a success or a failure of reception of the PDCCH or the error rate of the PDCCH to the upper layer of the terminal for each reception interval (e.g., monitoring occasion) of the PDCCH. Upon receiving the information indicating the success or failure of reception of the PDCCH or the error rate of the PDCCH from the PHY layer of the terminal, the upper layer of the terminal may declare a beam problem detection (or, beam failure) based on the received information or error rate. In this case, the upper layer of the terminal may trigger the beam recovery step S703 or the like.

Alternatively, when an uplink transmission is unsuccessful, the terminal may declare that a beam problem is detected. If the number of times that ACKs for uplink transmissions (e.g., grant-free uplink transmissions, SR transmissions, etc.) are not received is equal to or greater than a predetermined number, the terminal may declare a beam problem detection. Also, when a message directing adjustment of transmission timing of an uplink physical channel is not received from the base station before a preset timer expires, the terminal may declare a beam problem detection.

Alternatively, the base station may perform the beam monitoring operation based on uplink reference signals, and may declare a beam problem detection when a result of performing the beam monitoring operation conforms to a beam problem detection condition. When the beam problem is detected, the base station may transmit information indicating that the beam problem is detected, information instructing to perform a beam recovery operation or a beam sweeping operation, or information instructing to perform uplink transmission using another beam through a PDCCH, a paging channel, or a downlink channel (e.g., a multicast channel, a beam common channel, a base station common channel) that a plurality of terminals can receive. In this case, the base station may transmit, to the terminal, an identifier of the terminal, an index of a beam in which the beam problem is detected, indexes of downlink and uplink beams to be used by the terminal, and the like.

The above-described conditions used to detect the beam problem may be used to determine the success or failure of beam recovery after detection of the beam problem. When a plurality of beams are configured, the operation of detecting the beam problem in the beam problem detection step S702 may be performed on a beam-by-beam basis. When the beam problem is detected, the PHY layer, MAC layer or RRC layer of the terminal may trigger the beam recovery step S703 and the beam reconfiguration step S704, respectively.

The MAC layer may control a beam problem detection operation (i.e., the beam problem detection step S702), a beam recovery operation (i.e., the beam recovery step S703), and a beam reconfiguration operation (i.e., the beam reconfiguration step S704) for the configured beam (e.g., serving beam). Alternatively, some operations of the beam problem detection operation, the beam recovery operation, and the beam reconfiguration operation may be controlled by the MAC layer.

For example, the PHY layer of the terminal may transmit the IS_Ind or the OoS_Ind to the MAC layer of the terminal. In the case that the number of consecutively received OoS_Inds is equal to or greater than a predetermined value N or the IS_Ind is not received until a predetermined timer (e.g., timer for beam problem detection ($T_{BPD}$)) expires after reception of the OoS_Ind, the MAC layer of the terminal may determine that a PHY layer problem (e.g., beam problem) has occurred. Here, N may be a positive integer and the timer $T_{BPD}$ may be started when the OoS_Ind is received after the reception of the IS_Ind and may be reset when the IS_Ind is received after the reception of the OoS_Ind.

In the case that the number of consecutively received OoS_Inds is equal to or greater than N, the IS_Ind is not received until the expiration of the TBPD, or a beam problem is detected according to other reasons, the terminal may perform the beam recovery step S703 (or, the beam recovery and reconfiguration step). In the beam recovery step S703 (or the beam recovery and reconfiguration step), the PHY layer or MAC layer of the terminal may start a timer for beam recovery ($T_{BR}$), and transmit information indicating that the beam recovery step S703 (or, the beam recovery and reconfiguration step) has been started to the upper layer (e.g., RRC layer) of the terminal. Also, the terminal may transmit to the base station a PHY layer control channel, a MAC control message or an RRC message indicating that the beam recovery step S703 (or the beam recovery and reconfiguration step) has been started.

In the case that the IS_Ind is received until expiration of the $T_{BR}$ or it is recognized that the beam recovery is completed by another method, the PHY layer or MAC layer of the terminal may transmit information on the recovered beam (e.g., beam index, measurement result of the beam, etc.) to the upper layer (e.g., RRC layer) of the terminal. In this case, the terminal may perform communications with the base station using the recovered beam.

Also, the terminal may transmit a PHY layer control channel, a MAC control message, or an RRC message indicating the completion of the beam recovery to the base station. In this case, information indicating that the recovered beam is the same as the beam in which the beam problem is detected may also be transmitted to the base station via the PHY layer control channel, MAC control message or RRC message.

On the other hand, in the case that the IS_Ind is not received until the expiration of the $T_{BR}$, or the beam failure is recognized by another method, the terminal may perform the beam reconfiguration step S704. In the beam reconfiguration step S704, the terminal may perform the beam reconfiguration operation by using the configuration information of neighbor beams obtained in the connection configuration procedure between the terminal and the base station, obtained from system information, or obtained through the beam sweeping operation.

In the case that a beam pairing procedure with another beam among the plurality of beams of the same base station, which is other than the beam in which the beam problem is detected in the step S702, is completed until expiration of a timer for beam pairing ($T_{BP}$), it may be determined that the beam reconfiguration operation has been successfully completed. The beam reconfiguration step S704 may be performed for each of scenarios #1 and #2 below.

Scenario #1: a case in which the terminal has Resource-Config information for the newly-configured beam Scenario #2: a case in which the terminal does not have Resource-Config information for the newly-configured beam In the case that the beam reconfiguration operation has been successfully completed in the scenario #1, the PHY layer or the MAC layer of the terminal may transmit the configuration information of the reconfigured beam (e.g., beam index, etc.) and information indicating that the beam reconfiguration operation has been successfully completed to the upper layer (e.g., RRC layer) of the terminal. The terminal may perform communications with the base station using the reconfigured beam without updating (or reconfiguring) the Resource-Config information. Also, the terminal may transmit a PHY layer control channel, a MAC control message, or an RRC message indicating that the beam reconfiguration operation has been successfully completed to the base station. In this case, the configuration information of the reconfigured beam may also be transmitted to the base station through the PHY layer control channel, the MAC control message, or the RRC message.

In the case that the beam reconfiguration operation has been successfully completed in the scenario #2, the PHY layer or the MAC layer of the terminal may transmit the configuration information of the reconfigured beam (e.g., beam index, etc.) and information indicating that the beam reconfiguration operation has been successfully completed to the upper layer (e.g., RRC layer) of the terminal.

When it is identified that the beam reconfiguration operation has been successfully completed, the RRC layer of the terminal may transmit an RRC message requesting configuration of a resource for the reconfigured beam to the base station. Alternatively, a MAC control message requesting configuration of a resource for the reconfigured beam may be transmitted to the base station instead of the RRC message. Upon receiving the information indicating that the beam reconfiguration operation has been successfully completed and the information requesting resource configuration for the reconfigured beam from the terminal, the base station may generate Resource-Config information for the reconfigured beam, and transmit a message including the generated Resource-Config information to the terminal.

Also, when it is reported to the base station that the beam reconfiguration operation has been successfully completed, the terminal may report a measurement result for the plurality of beams of the base station to the base station. In this case, the base station may select another beam other than the beam reconfigured by the terminal based on the measurement result received from the terminal, and transmit a message including information instructing to perform a reconfiguration operation with the selected beam or configuration information of the selected beam.

However, in the case that the beam reconfiguration operation is not completed until the expiration of the $T_{BP}$, the terminal may determine that an RLF has occurred. In this case, the terminal may perform the radio link re-establishment step S705. In the case that the beam detection operations, the beam recovery operations, and the beam reconfiguration operations have been performed for the plurality of beams, or the $T_{BP}$s for all the beams have been expired, the terminal may determine that an RLF has occurred.

Alternatively, in the case that a plurality of beams are configured (e.g., when a plurality of serving beams are configured), the terminal may determine that an RLF has occurred when the beam reconfiguration operation for the primary beam among the plurality of beams fails. For example, when the primary beam is the beam #1 in FIG. 7, the terminal may determine that an RLF has occurred at the end of the beam reconfiguration step S704-1 when the beam reconfiguration operation for the beam #1 has failed. In this case, the beam reconfiguration operations for the remaining beams (e.g., beam #2, . . . , beam #K) may be terminated. That is, the timers for the beam reconfiguration operations for the remaining beams (e.g., beam #2, . . . , beam #K) may be stopped.

However, when necessary, after the beam reconfiguration steps (S704-1, S704-2, . . . S704-K) for all the beams (e.g., beam #1, beam #2, . . . , beam #K), the terminal may determine whether or not the RLF has occurred. In this case, the starting points of the radio link re-establishment steps (S705-1, S705-2, . . . S705-K) for all the beams (e.g., beam #1, beam #2, . . . , beam #K) may be aligned to the time when it is determined that the RLF has occurred. When the beam reconfiguration operation has not been successfully completed until the expiration of the $T_{BP}$ or it is determined by another method that the RLF has occurred, the terminal may perform the radio link re-establishment operation by searching for beams of the base station (e.g., the same base station or another base station) until expiration of a timer for re-establishment (e.g., $T_{Re-est}$).

When the radio link re-establishment operation has been successfully completed, the base station may generate a message including the Resource-Config information (e.g., a message for establishing a connection) and transmit the generated message to the terminal. The terminal may receive the message including the Resource-Config information from the base station, and may configure the corresponding parameters based on the Resource-Config information included in the message.

When the radio link re-establishment operation with the base station has not been completed until the expiration of $T_{Re-est}$, the operational state of the terminal may transition from the RRC_CONNECTED state to the RRC_INACTIVE state or the RRC_IDLE state. For example, when the $T_{Re-est}$s for all the beams (e.g., beam #1, beam #2, ..., beam #K) are terminated, the operational state of the terminal may transition from the RRC_CONNECTED state to the RRC_I-NACTIVE state or the RRC_IDLE state.

In the case that a plurality of beams (e.g., beam #1, beam #2, ..., and beam #K shown in FIG. 7) are configured between the base station and the terminal and the beam #1 in FIG. 7 is the primary beam, when the beam recovery operation on the primary beam (e.g., the beam #1) has failed, irrespective of the beam recovery operations for the other beams (e.g., beam #2, ..., beam #K), the terminal may declare a beam failure at the end of the beam recovery step S703-1, and perform the beam reconfiguration operation after the declaration of the beam failure.

Also, in the case that a plurality of beams (e.g., beam #1, beam #2, ..., and beam #K shown in FIG. 7) are configured between the base station and the terminal and the beam #1 in FIG. 7 is the primary beam, when the beam reconfiguration operation on the primary beam (e.g., the beam #1) has failed, irrespective of the beam reconfiguration operations for the other beams (e.g., beam #2, ..., beam #K), the terminal may declare a beam failure at the end of the beam reconfiguration step S704-1, and perform the radio link re-establishment operation after the declaration of the beam failure.

The beam reconfiguration step S704 may be performed after the beam recovery step S703. That is, the beam recovery step S703 and the beam reconfiguration step S704 may be performed consecutively in the time axis. Alternatively, the beam recovery step S703 and the beam reconfiguration step S704 may be performed in parallel. For example, when a received signal quality (e.g., RSSI, RSRP, RSRQ, etc.) measured in the beam recovery step S703 is equal to or less than a predetermined reference value, the beam reconfiguration step S704 may be performed even before the expiration of the $T_{BR}$. A condition (e.g., a reference value for the beam reception signal or a separate timer for triggering the beam reconfiguration step S704 (e.g., $T_{early\_BP}$) before the end point of the beam recovery step S703 may be configured. Here, the reference value and a setting value for the $T_{early\_BP}$ may be transmitted to the terminal through system information or a control message (e.g., control message including the Resource-Config information).

Also, the radio link re-establishment step S705 may be performed after the beam reconfiguration step S704. That is, the beam reconfiguration step S704 and the radio link re-establishment step S705 may be performed consecutively in the time axis. Alternatively, the beam reconfiguration step S704 and the radio link re-establishment step S705 may be performed in parallel. For example, when a received signal quality (e.g., RSSI, RSRP, RSRQ, etc.) measured in the beam reconfiguration step S704 is equal to or less than a predetermined reference value, the radio link re-establishment step S705 (or, a preparation operation for the radio link re-establishment) may be performed even before the expiration of the $T_{BP}$.

A condition (e.g., a reference value for the beam reception signal or a separate timer for triggering the radio link re-establishment step S705 (e.g., $T_{early\_ReEST}$)) before the end point of the beam reconfiguration step S704 may be configured. Here, the reference value and a setting value for the $T_{early\_ReEST}$ may be transmitted to the terminal through system information or a control message (e.g., control message including the Resource-Config information).

The base station may transmit an RRC message or a MAC control message including the Resource-Config information to the terminal. The RRC message used for transmitting the Resource-Config information may be a connection reconfiguration message (e.g., RRCConnectionReconfiguration message) used for RRC connection establishment. Alternatively, the RRC message used for transmitting the Resource-Config information may be transmitted based on a format of the connection reconfiguration message.

Also, a partial connection reconfiguration message (e.g., a message to which a delta signaling scheme is applied) including only changed parameters among the parameters included in the connection reconfiguration message may be generated, and the partial connection reconfiguration message may be used to transmit the Resource-Config information. Alternatively, the base station may generate a separate beam reconfiguration control message including only the Resource-Config information, and may transmit the generated beam reconfiguration control message to the terminal. Also, when the Resource-Config information indicates a mapping, replacement, or change of a radio resource index (e.g., beam index) according to the beam reconfiguration instead of the radio resource allocation information (e.g., radio resource configuration information), or when the Resource-Config information indicates activation or inactivation of a radio resource (e.g., beam) instead of the radio resource allocation information (e.g., radio resource configuration information), the Re source-Config information may be transmitted to the terminal via a PHY layer control channel (e.g., an indication field included in the control channel) or a MAC control message.

In the case that the beam problem detection operation, the beam recovery operation, and the beam reconfiguration operation are performed mainly by the MAC layer, the updated Resource-Config information (e.g., changed Resource-Config information) may be transmitted to the terminal via a PHY layer control channel or a MAC control message instead of an RRC message. A method in which the beam problem detection step S702 to the beam recovery step S703 are controlled by the MAC layer or a method in which the beam problem detection step S702 to the beam reconfiguration step S704 are controlled by the MAC layer may be considered.

The beam monitoring operation may be performed using specific signals for each base station (or beam) in order for the MAC layer to mainly perform the monitoring operation for the beam problem detection operation, the beam recovery operation, and the beam reconfiguration operation. For example, the terminal may perform the beam monitoring operation using the PHY layer control channel (e.g., PDCCH, PUCCH) or the common reference signal instead of the RRC message. In this case, the terminal may perform the beam monitoring operation using the synchronization signal, the reference signal for the PHY layer control channel, or the reference signal for beam sweeping.

The signals described above (e.g., synchronization signal, reference signal) may be uniquely configured for each base station (or each beam), the terminal may identify each base station or beam using the corresponding signal, and measure a received signal quality for the base station or beam. Here, the reference signal for the PHY layer control channel may include a reference signal used for demodulating the PHY layer control channel, a reference signal used for identifying an antenna port, a reference signal for identifying an arrangement of an antenna array for beamforming, or a reference signal used for location based services. The reference signal for beam sweeping may be a reference signal for beam monitoring operation. The reference signal for the PHY layer control channel or the reference signal for beam sweeping may be periodically or aperiodically transmitted in a fixed time-frequency resource or fixed time-frequency resources.

Accordingly, since the terminal may know a transmission pattern of the reference signal without receiving a signaling message including configuration information of the reference signal described above (e.g., the message including the changed Resource-Config information), the terminal may perform the beam monitoring operation using the reference signal in the beam problem detection step S702, the beam recovery step S703, and the beam reconfiguration step S704.

Beam Recovery Operation (e.g., Recovery Operation of the Same Beam)

When the same beam is successfully recovered by the beam recovery operation, the MAC layer of the terminal may transmit information indicating that the same beam has been successfully recovered to the RRC layer of the terminal. Alternatively, without transmitting information indicating that the same beam has been successfully recovered, the MAC layer of the terminal may control operations of the MAC layer or the PHY layer according to the Resource-Config information configured before the beam recovery operation. When necessary, the MAC layer or the RRC layer of the terminal may generate a control message including the identifier of the terminal, downlink and uplink beam indexes, beam measurement results, and the like, and may transmit the generated control message to the base station. Here, the control message may indicate that beam recovery has been successfully completed. In this case, the Resource-Config information configured before the beam recovery operation may be reused.

In the beam recovery step S703, an uplink radio resource (or signal) mapped to the synchronization signal, the reference signal for the PHY layer control channel, or the reference signal for beam sweeping, which is a search and measurement target, may be configured. For example, a mapping relationship between the downlink signal and an uplink RA resource, an SRS, a PHY layer uplink control channel, or a reference signal for uplink beam sweeping may be defined. In this case, when a beam corresponding to a beam recovery condition is found in the beam recovery step S703, the terminal may transmit an uplink signal corresponding to the downlink signal of the found beam to inform the base station that the beam recovery has been completed successfully.

In the case where the above-described method is used, even when the index of the recovered beam is not transmitted to the base station after the beam recovery has been successfully completed, the base station may identify the index of the recovered beam based on the uplink signal received from the terminal or a radio resource (e.g., physical resource block (PRB)) occupied by the received uplink signal. When necessary, the terminal may transmit a control message including the beam measurement result to the base station. The control message including the beam measurement result may be a RA message, a MAC control message or an RRC message. The RA message may be a first message (e.g., a RA MSG1) transmitted by the terminal in the RA procedure or a second message (e.g., a RA MSG3) transmitted by the terminal in the RA procedure. When the beam measurement result is transmitted through the RA message, the format of the RA message may be the same as the format of the MAC control message.

When there is no predefined mapping relationship between the synchronization signal, the reference signal for the PHY layer control channel, or the reference signal for beam sweep, and the uplink signal in the beam recovery step S703, the control message indicating the successful completion of the beam recovery may be configured in a form of a RA message, a MAC control message, or an RRC message. In this case, the control message may include the index of the recovered beam, the beam measurement result, the terminal identifier, and the like.

Even when the same downlink beam is selected as the result of the beam recovery operation, an uplink beam may be selected as an uplink beam other than the uplink beam used before the beam recovery operation. If it is identified that another uplink beam is selected as the result of the beam recovery operation, the MAC layer of the terminal may transmit information indicating that another uplink beam is selected to the RRC layer of the terminal. In this case, the MAC layer or the RRC layer of the terminal may transmit to the base station information indicating that the beam recovery operation has been successfully completed, configuration information (e.g., beam index) of the new uplink beam selected in the beam recovery operation, the measurement result of the new uplink beam, and the like.

The base station may receive the control message from the terminal and confirm that the beam recovery operation has been successfully completed based on the control message. Also, the base station may obtain configuration information (e.g., beam index) of the new uplink beam, the measurement result of the new uplink beam, and the like from the control message. In this case, the base station may configure Resource-Config information based on one of the following methods.

Method 1: The base station transmits information indicating reuse of the Resource-Config information to the terminal.

Method 2: The base station generates Resource-Config information and transmits a control message including the generated Resource-Config information to the terminal.

Method 3: The base station generates a control message including only parameters changed according to the new uplink beam, among the parameters in the Resource-Config information, and transmits the generated control message to the terminal.

The control message according to the Method 1, the Method 2, or the Method 3 may be transmitted through a PHY layer control channel. In this case, the control message may be in a form of a DCI, a UCI, or an indicator (e.g., field). Alternatively, the control message according to the Method 1, the Method 2, or the Method 3 may be a MAC control message or an RRC message.

Beam Reconfiguration Operation

The terminal may perform the beam reconfiguration operation (e.g., beam monitoring operation) after the beam recovery operation has failed (e.g., after the beam failure has been determined), and the beam selected by the beam reconfiguration operation may be one of the following beams.

Case 1: The same beam as the previous serving beam (e.g., the beam in which a beam failure is determined in the beam recovery step)

Case 2: Another beam of the serving base station (e.g., the base station to which the beam in which a beam failure is determined in the beam recovery step belongs)

Case 3: A beam of a base station other than the serving base station (e.g., the base station to which the beam in which a beam failure is determined in the beam recovery step belongs) In Case 1, the terminal may perform the operations specified in the 'recovery operation of the same beam' described above.

In Case 2, the control message used to change the Resource-Config information may be at least one of a PHY layer control channel (e.g., indication field), a MAC control message, and an RRC message. Here, when a MAC control message or an RRC message is used, a form of a control message applied to a beam change operation (e.g., a beam switching operation) in the same base station according to a general procedure other than the beam recovery operation or the beam reconfiguration operation. In this case, the control message may indicate a change of the configuration information of the MAC layer, a change of the configuration parameters of the PHY layer control channel, or a change of the reference signals according to the beam change (e.g., beam switching).

Here, the configuration information of the MAC layer may be configuration parameters in the MACmain_config message among the RRC control messages of the LTE system. The configuration parameters of the PHY layer control channel may be parameters constituting the PhysicalConfigDedicated, PUCCH-Config, RACH-ConfigCommon, RACH-ConfigDedicated, RadioResourceConfigCommon, or RadioResourceConfigDedicated message among the RRC control messages of the LTE system. Therefore, the control message for beam switching in the same base station may be a MAC control message, not an RRC message.

In case 2, the RRC message or the MAC control message for beam switching in the same base station may indicate a change (e.g., update) of the configuration information of the MAC layer or the configuration parameters of the PHY layer control channel constituting the Resource-Config information.

In particular, when a MAC control message is used, the Resource-Config information for a plurality of beams in the base station may be configured by an RRC message in a procedure of establishing an RRC connection. When the beam is reconfigured, each of the mapping, replacement, or change operation of the radio resource index configured by the Resource-Config information and the radio resource activation or inactivation operation may be indicated by the MAC control message or the PHY layer control channel in the RRC connection establishment procedure.

Alternatively, the terminal may transmit a MAC control message including information on the target beam selected by the beam monitoring operation (e.g., beam index, beam measurement result) to the base station. The base station receiving the information on the target beam from the terminal may operate based on one of the following methods.

Method A: The MAC layer of the base station may report the information on the target beam to the RRC layer of the base station.

(Method A-1): The RRC layer of the base station may receive the information on the target beam from the MAC layer of the base station, generate the Resource-Config information based on the information on the target beam, and transmit the Resource-Config information to the MAC layer of the base station. The MAC layer of the base station may receive the Resource-Config information from the RRC layer of the base station, and transmit a MAC control message including the Resource-Config information to the terminal.

(Method A-2): The RRC layer of the base station may receive the information on the target beam from the MAC layer of the base station, generate the Resource-Config information based on the information on the target beam, and transmit an RRC message including the Resource-Config information to the terminal.

Method B: The MAC layer of the base station may generate the Resource-Config information based on the target beam, and transmit a MAC control message including Resource-Config information to the terminal. Also, the MAC layer of the base station may transmit the Resource-Config information to the RRC layer of the base station.

In case 2, the downlink beam may be changed and the uplink beam may be the same as the previous uplink beam. In this case, the MAC layer of the terminal may transmit information indicating that the beam reconfiguration operation has been successfully completed, an indicator (e.g., information on the uplink beam) indicating that the same uplink beam has been reconfigured by the beam reconfiguration operation, and the like to the upper layer (e.g., RRC layer) of the terminal. Alternatively, the MAC layer of the terminal may control the functions of the MAC layer or the PHY layer of the terminal to be performed based on the configuration parameters of the uplink beam in the Resource-Config information that has been already configured.

The MAC layer of the terminal may transmit a control message (e.g., MAC control message) indicating that the beam reconfiguration operation has been successfully completed to the base station. Alternatively, the RRC layer of the terminal may transmit a control message (e.g., RRC message) indicating that the beam reconfiguration operation has been successfully completed to the base station. Here, the control message may include the identifier of the terminal, information on the reconfigured beam (e.g., beam measurement result, beam index), and the like. The base station may receive the control message from the terminal, and confirm the information on the uplink beam included in the control message (e.g., the information on the configured beam). When the same uplink beam is reconfigured by the beam reconfiguration operation, the base station may transmit a control message (e.g., a PHY layer control channel, a MAC message, an RRC message, or the like) including information indicating that the configuration information of the uplink beam in the Resource-Config information is reused.

Here, the RRC message may include partial Resource-Config information including only changed parameters by applying a delta signaling scheme.

Alternatively, the RRC message may indicate that the configuration information of the uplink beam in the Resource-Config information is reused. When a PHY layer control channel (e.g., indicator) or a MAC control message is used, the PHY layer control channel or MAC control message may indicate the reuse (e.g., activation) of the Resource-Config information.

In Case 3, the terminal may transmit a control message requesting a handover or a measurement result triggering a handover together with the beam monitoring result. Upon receiving the control message requesting a handover or the measurement result triggering a handover, the base station may perform a handover procedure. In this case, the terminal may receive the Resource-Config information of the target base station from the serving base station or the target base station.

Meanwhile, the beam problem detection step S702, the beam recovery step S703, the beam reconfiguration step S704, and the radio link re-establishment step S705 described above with reference to FIG. 7 may be controlled partially by each of the layers belonging to the terminal or the base station. For example, the steps illustrated in FIG. 7 may be controlled by each of the layers as described below.

FIG. 8 is a flow chart illustrating a first embodiment of a beam management procedure in a communication system.

Referring to FIG. 8, the beam management procedure may be controlled by at least one of a MAC layer and an RRC layer. For example, the beam management procedure may be as shown in Table 2 below.

TABLE 2

|  | Beam problem detection step | Beam recovery step | Beam reconfiguration step | Radio link re-establishment step |
| --- | --- | --- | --- | --- |
| Method 1 | MAC layer | MAC layer | RRC layer | RRC layer |
| Method 2 | MAC layer | MAC layer | MAC layer | RRC layer |
| Method 3 | RRC layer | RRC layer | RRC layer | RRC layer |

In Method 1, the beam problem detection step and the beam recovery step may be controlled by the MAC layer, and the beam reconfiguration step and the radio link re-establishment step may be controlled by the RRC layer. In Method 2, the beam problem detection step, the beam recovery step, and the beam reconfiguration step may be controlled by the MAC layer, and the radio link re-establishment step may be controlled by the RRC layer. In Method 3, the beam problem detecting step, the beam recovery step, the beam reconfiguration step, and the radio link re-establishment step may be controlled by the RRC layer.

The following operations may be further applied when the MAC layer of the terminal transmits at least one of the management result of the radio link and the result of the beam monitoring operation to the RRC layer of the terminal or when the terminal reports the same to the base station.

When a beam problem is detected based the IS_Ind or OoS_Ind obtained from the PHY layer or information obtained by another method, the PHY layer or MAC layer of the terminal may report information indicating that the beam problem has been detected to the upper layer (e.g., MAC layer or RRC layer). Also, the terminal may transmit the information indicating that the beam problem has been detected to the base station by using an available uplink channel (e.g., PUCCH or PUSCH) or a RA channel (e.g., physical RA channel (PRACH)).

Upon receiving the information indicating that the beam problem has been detected from the terminal, the base station may configure Resource-Config information for another beam or a plurality of beams, and transmit the Resource-Config information to the terminal. The terminal may receive the Resource-Config information (e.g., updated or changed Resource-Config information) from the base station, and perform a beam monitoring operation using the Resource-Config information.

When the same beam is recovered by the beam recovery operation (S803 to S804), the MAC layer of the terminal may transmit information indicating that the same beam has been successfully recovered by the beam recovery operation to the RRC layer of the terminal. In this case, the terminal may not transmit to the base station the information indicating that the same beam has been successfully recovered by the beam recovery operation.

On the other hand, when the beam recovery fails in the beam recovery operation (S803 to S804), the MAC layer of the terminal may perform a beam reconfiguration operation (S805 to S806). When the beam reconfiguration operation has been successfully completed, the MAC layer of the terminal may transmit information indicating that the beam reconfiguration operation has been successfully completed to the RRC layer of the terminal. Also, the terminal may transmit a control message including the result of the beam reconfiguration operation to the base station in the following cases.

A case in which the same beam is reconfigured after expiration of a predetermined timer (e.g., $T_{Info\text{-}Update}$). Here, a setting value for the $T_{Info\text{-}Update}$ may be transmitted to the terminal via system information or a dedicated control message A case in which another beam is reconfigured as the beam (e.g., uplink beam or downlink beam) in the beam reconfiguration operation In this case, the MAC layer or the RRC layer of the terminal may generate a control message to be transmitted to the base station. When the information indicating that the beam reconfiguration operation has been successfully completed is received from the terminal after the expiration of $T_{Info\text{-}Update}$, the base station may reconfigure parameters required to be changed or updated among the parameters in the Resource-Config information, and transmit a control message including the reconfigured parameters to the terminal.

Here, the control message may be a control message used for the beam switching operation at the same base station. The control message for the beam switching operation may be a message including the Resource-Config information or MAC layer configuration information, and may be configured in a form of an RRC message or a MAC control message. The control message may include parameters necessary for the beam monitoring operation (S801 to S802), the beam recovery operation (S803 to S804), the beam reconfiguration operation (S805 to S806), and the radio link re-establishment operation (S807 to S808) for radio link management.

Alternatively, the control message (e.g., control signaling) used in the beam switching operation may be transmitted over a PHY layer control channel. For example, a signal configured for radio link management, an indicator for indicating activation of radio resources, or an indicator for indicating inactivation for radio resources may be transmitted through a PHY layer control channel.

When the result of the beam monitoring operation (S801 to S802), the result of the beam recovery operation (S803 to S804), the result of the beam reconfiguration operation (S805 to S806), or the result of the radio link re-establishment operation (S807 to S808) are obtained from the terminal, the base station may transmit, to the terminal, the signal configured for radio link management, the indicator for indicating activation of radio resources, or the indicator for indicating inactivation for radio resources by using a PHY layer control channel.

Upon receiving the indicator for indicating activation or inactivation for radio resources from the base station through the PHY layer control channel, the terminal may perform a beam management operation for the beam monitoring operation (S801 to S802) by activating or inactivating the radio resources.

When the beam recovery or beam reconfiguration to a beam of another base station other than the serving base station has been completed through the beam management operation, the terminal may transmit a control message requesting a handover. Upon receiving information indicating that the beam recovery or beam reconfiguration to the beam of another base station other than the serving base station has been completed, the serving base station may initiate (e.g., trigger) a handover procedure. Alternatively, the base station may transmit a control message requesting to initiate a handover procedure to the terminal.

Radio Link Re-Establishment Operation

When the beam reconfiguration operation has not been successfully completed, the terminal may determine a radio link failure (RLF). In this case, the terminal may perform the radio link re-establishment operation (S705 in FIG. 7, S807 to S808 in FIG. 8). In this case, the terminal may perform a beam search and measurement operation (e.g., beam sweeping operation) to detect a beam that meets a radio link re-establishment condition. The terminal may perform beam the search and measurement operation on beams of the serving base stations as well as beams of other base stations.

If a beam meeting the radio link re-establishment condition is detected before expiration of a predetermined timer, the terminal may perform the radio link re-establishment operation with the detected beam. Here, a setting value for the predetermined timer may be transmitted from the base station to the terminal via a PHY layer control channel, a MAC control message or an RRC message. The base station performing the step S705 (e.g., the steps S807 to S808) with the terminal may be the same as the base station performing the steps S701 to S704 (e.g., the steps S801 to S806). Alternatively, the base station performing the step S705 (e.g., the steps S807 to S808) with the terminal may be different from the base station performing the steps S701 to S704 (e.g., the steps S801 to S806).

In the radio link re-establishment step, the base station may transmit a control message (e.g., a control message for connection establishment) including Resource-Config information to the terminal. The terminal may receive the control message including the Resource-Config information from the base station, and configure parameters based on the Resource-Config information included in the control message.

On the other hand, when a beam meeting the radio link re-establishment condition is not detected within the time according to the predetermined timer, the terminal may determine that the radio link re-establishment operation has failed. In this case, the operational state of the terminal may transition from the RRC connected state to the RRC inactive state or the RRC idle state.

In the case that the RRC layer controls the procedure shown in FIG. 7 or 8 instead of the MAC layer (e.g., Method 3 of Table 2), the information (e.g., information related to the beam problem detection step, information related to the beam recovery step, information related to the beam reconfiguration step, etc.) generated and acquired at the MAC layer according to the Method 1 or 2 of Table 2 may be transmitted to the RRC layer. For example, the OoS_Ind or IS_Ind generated by the PHY layer of the terminal may be transmitted to the RRC layer through the MAC layer. When the Method 3 of Table 2 is performed, the RRC layer instead of the MAC layer may mainly perform the procedure shown in FIG. 7 or 8.

On the other hand, the management operation of the beam/radio link may not be performed according to the order shown in FIG. 7 or FIG. 8. Also, when the management operation of the beam/radio link is performed, all the steps shown in FIG. 7 or 8 may be selectively performed, some steps shown in FIG. 7 or 8 may be performed in parallel, and some of the steps shown in FIG. 7 or 8 may be integrated into a single step.

For example, the beam recovery operation (S703 in FIG. 7 or S803 to S804 in FIG. 8) and the beam reconfiguration operation (S704 in FIG. 7 or S805 to S806 in FIG. 8) may be integrated into a single operation. Alternatively, the beam recovery operation (S703 in FIG. 7 or S803 to S804 in FIG. 8) may be performed in parallel with the beam reconfiguration operation (S704 in FIG. 7 or S805 to S806 in FIG. 8). When the beam recovery operation and the beam reconfiguration operation are integrated into a single operation, the beam recovery operation may be merged into the beam reconfiguration operation, or the beam reconfiguration operation may be merged into the beam recovery operation. In this case, one timer and reference value may be used instead of the timers and reference values for the beam recovery operation and the beam reconfiguration operation. For example, one of the above-described $T_{BR}$ and $T_{BP}$ may be used.

The beam recovery operation and the beam reconfiguration operation may be performed for the beam belonging to the serving base station and the radio link re-establishment operation may be performed for the beam belonging to the base station other than the serving base station. In this case, the control message used for configuring the Resource-Config information in the procedure shown in FIG. 7 or 8 may be configured in a form of a PHY layer control channel, a MAC control message, or an RRC message.

Also, the procedure shown in FIG. 7 or 8 may be applied even when one or more configured beams (e.g., serving beam) are used between the base station and the terminal. In the procedure shown in FIG. 7 or 8, the base station may control the terminal to report statistical history information for each of the beam problem detection operation, the beam recovery operation, the beam reconfiguration operation, and the radio link re-establishment operation.

For example, the base station may control the terminal to report at least one of a received signal quality of the beam, a beam index, an identifier of the base station, a completion time of beam recovery from a time point at which the beam problem is detected, or a time required until a completion time of beam reconfiguration, a time required until a completion time of radio link re-establishment from a time point at which the radio link failure is determined, and a position of the terminal.

Also, the terminal may report at least one of a frequency of beam problem detections, a frequency (or success rate) of beam recovery successes, and a frequency (or failure rate) of beam recovery failures according to the configuration of the base station. For this purpose, the base station may configure a measurement interval (or duration), a measurement time, and a reporting time for calculating the corresponding report values. The base station may also define an event that triggers the measurement or the reporting. The terminal may perform the measurement according to the condition configured by the base station, and report the measurement result using a MAC control message or an RRC message. The terminal may transmit to the base station measurement or report parameters configured by the base station in association with a specific event when the specific event occurs in each of the beam problem detection operation, the beam recovery operation, the beam reconfiguration operation, and the radio link re-establishment operation. Alternatively, the terminal may transmit an event occurring in a predetermined interval (or duration) and a parameter (e.g., an average value or a standard deviation of the parameter) related to the event to the base station according to a preset reporting cycle. Alternatively, when a preset reporting condition is met, the terminal may transmit to the base station an event occurring in a predetermined interval (or duration) and a parameter (e.g., an average value or a standard deviation of the parameter) related to the event.

On the other hand, the beam management operation may not be associated with the radio link management operation. Here, the beam management operation may include the beam monitoring operation, the beam problem detection operation, the beam failure declaration operation, the beam recovery operation, the beam reconfiguration operation, the beam re-pairing operation, and the like. The radio link management operation may include the radio link monitoring operation, the radio link problem detection operation, the radio link failure declaration operation, the radio link recovery operation, the radio link re-establishment operation, and the like.

In the case that the beam management operation is distinguished from the radio link management operation, the beam failure or the beam recovery failure according to the beam management operation may not be associated with the radio link failure. Also, the beam failure or the beam recovery failure according to the beam management operation may not trigger the radio link re-establishment operation.

In the radio link management operation, the PHY layer of the terminal may transmit the IS_Ind or the OoS_Ind to the upper layer (e.g., MAC layer or RRC layer), and the upper layer may detect a problem of the radio link based on the OoS_Ind or the IS_Ind. Alternatively, when successive RA attempts fail or when a reference condition according to a retransmission failure is met, the terminal may determine that a radio link problem has been detected. In this case, the terminal may declare a radio link failure (RLF).

The terminal may perform the beam management operation independently of the radio link management operation. For example, when a beam problem is detected based on the error rate of the PDCCH or when a beam failure is declared based on the error rate of the PDCCH, the terminal may perform the beam recovery operation and the beam reconfiguration operation (e.g., beam re-pairing operation). In the case that the beam failure is declared, the beam recovery fails, or the beam reconfiguration fails, the terminal may not trigger the radio link re-establishment and reconfiguration operation in the following cases.

Case 1: A case in which downlink synchronization is maintained according to a criterion of the radio link management operation Case 2: A case in which an RLF is not declared according to a criterion of the radio link management operation or a case in which a condition for declaring an RLF is not met according to a criterion of the radio link management operation (e.g., a case in which the number of RA attempts or retransmission attempts is equal to or less than a reference value) Therefore, even when the beam failure is declared or the beam recovery fails, the terminal may not perform the radio link re-establishment and reconfiguration operation due to the beam failure or the beam recovery failure before triggering the declaration of an RLF according to a criterion of the radio link management operation or the radio link re-establishment and reconfiguration operation.

However, when a problem of a core radio link is detected by the radio link management operation, or when a failure of a core radio link is declared by the radio link management operation, the terminal may perform the beam recovery operation even before the beam problem detection or the beam failure declaration according to the beam management operation. Here, the core radio link may be a radio link established and managed between the base station and the terminal. For example, the core radio link may be as follows.

A radio link used for transmitting and receiving a downlink PHY layer control channel or an uplink PHY layer control channel for the terminal A radio link which is a reference for maintaining downlink synchronization or uplink synchronization A radio link in which a CORESET is configured in a NR system to which a radio resource structure supporting multiple numerologies A radio link for a primary cell (e.g., PCell or PSCell) when a carrier aggregation (CA) function or a dual connectivity (DC) function is supported Here, the radio link may be a PHY layer radio channel, a beam to which beamforming is applied, a part of the system bandwidth (e.g., BWP of the NR system) of the base station (e.g., cell), or the like. The radio link may be a radio link in which radio resources allocated to the terminal exist, and may be an object of the radio link management operation.

Also, the entity performing the beam management operation and the entity performing the radio link management operation may be distinguished. For example, in the beam management operation, the beam problem detection step, the beam failure declaration step, and the beam recovery step may be mainly performed by the PHY layer of the terminal. In the radio link management operation, the radio link failure declaration step, the radio link recovery step, and the radio link reconfiguration and re-establishment step may be performed by the MAC layer or the RRC layer of the terminal. That is, the MAC layer or the RRC layer of the terminal may perform the radio link management operation based on the information obtained from the PHY layer of the terminal.

When the beam management operation is primarily performed by the PHY layer of the terminal, the PHY layer of the terminal may perform the beam recovery operation when the beam problem is detected. When the beam failure or the beam recovery failure is identified, the PHY layer of the terminal may declare the beam failure or the beam recovery failure and may transmit the result of the declaration to the upper layer (e.g., MAC layer or RRC layer) of the terminal. Upon receiving information indicating the beam failure or the beam recovery failure from the PHY layer of the terminal, the upper layer of the terminal may identify whether an RLF condition according to the radio link management operation is met or not, and maintain functions of the upper layer when the RLF condition is not met. In this case, the terminal may monitor a PDCCH and perform a beam search operation (e.g., beam sweeping operation) in the current frequency band and another frequency band (e.g., BWP).

When the beam failure or the beam recovery failure is finally determined, the terminal may not perform a reception operation of the downlink channel (e.g., PDCCH, PDSCH, etc.) and may restrictedly perform a transmission operation of the uplink channel. For example, the terminal may not perform an uplink channel transmission operation except transmission of a RA preamble and transmission of a control message through a PUCCH for reporting the beam recovery failure.

Also, the upper layer of the terminal may trigger the PHY layer of the terminal to perform a monition and search operation on a reference signal of the serving beam (e.g., reference signal assigned to the terminal), a common reference signal for initial access procedure or initial cell search procedure, a reference signal for management of a beam or a radio link, or a burst of synchronization signals. When the RLF condition according to the radio link management operation is met, the functions of the upper layer of the terminal may be reset and the radio link reconfiguration and re-establishment operation may be performed.

A method of configuring parameters for beam measurement and radio channel measurement and an effective control method may be required for the beam management operation or the radio link management operation. For example, measurement procedures and measurement result reporting procedures for the configured beam, the active beam, the measurement target beam, and the neighbor beam may be required for control of the beam management operation, an operation of determining and overcoming a beam blockage by obstacles on the radio link, and the beam switching operation.

The base station or terminal may measure the reference signal of the radio channel (e.g., beam) continuously or discontinuously. The terminal may report the measurement result based on the parameters configured for the measurement or the measurement result reporting. In the measurement and reporting procedure of the reference signal of the radio channel (e.g., beam), a reception quality of the reference signal or a change in the reception quality per unit time may be measured, and the measurement result may be reported. For example, when the change in the reception quality of the reference signal corresponds to a preset condition (e.g., a sudden change in the reception quality) in a preset measurement interval (or duration) (e.g., a measurement unit time), the beam management operation may be controlled to be performed.

For example, when the reception quality of the reference signal is less than or equal to a preset reference value, or when the reception quality of the reference signal is kept to be equal to or less than a preset reference value for a predetermined time period (e.g., a time period according to a timer), it may be determined that a beam or radio link problem, a beam or radio link failure, or a beam blockage has occurred. Also, when the reception quality of the reference signal exceeds a preset reference value, or when the reception quality of the reference signal is kept to be greater than a preset reference value for a predetermined time period (e.g., a time period according to a timer), a success of the beam or radio link recovery, a success of the beam switching operation, or a release of the beam blockage may be determined.

For example, the base station or the terminal may measure the reception quality of the reference signal for controlling each of the beam blockage determination operation and the beam switching operation. When a deterioration rate of the measured reception quality (e.g., a deterioration rate of the reception quality measured per unit time) is equal to or greater than a preset reference value or when the deterioration rate of the measured reception quality is kept to be equal to or less than a preset reference value for a predetermined time period (e.g., a time period according to a timer), the terminal or the base station may determine that a beam blockage has occurred. In this case, the base station or the terminal may perform an inactivation operation or a beam switching operation on the beam in which the beam blockage has occurred.

For example, when the timer is set to 2 seconds and the preset reference value is 10 dB, the timer may be reset to 0 if the deterioration rate of the reception quality of the reference signal is less than 10 dB for the time period according to the timer. On the other hand, when the timer is set to 2 seconds and the preset reference value is 10 dB, the terminal or the base station may determine that a beam blockage has occurred if the deterioration rate of the reception quality of the reference signal is equal to or greater than 10 dB for the time period according to the timer. In this case, the base station or the terminal may perform a beam inactivation operation or a beam switching operation on the beam in which the beam blockage has occurred. Also, the timer may be reset to '0', or may be stopped.

Alternatively, when an enhancement rate of the reception quality of the reference signal is equal to or greater than a preset reference value, or when the enhancement rate of the reception quality of the reference signal is kept to be equal to or greater than a preset reference value for a predetermined time period (e.g., a time period according to the timer), the base station or the terminal may determine that the beam blockage has been released. In this case, the base station or the terminal may activate the beam in which the beam blockage has been released. Alternatively, the base station or the terminal may switch the current beam to the beam for which the beam blockage is determined to be released. Here, the timer may be used for determining whether the beam blockage is releaser or not, or for controlling the beam switching operation.

If the enhancement rate of the reception quality of the reference signal deviates from a preset reference value before the expiration of the timer, the timer may be restarted. For example, when the timer is set to 2 seconds and the preset reference value is 10 dB, the timer may be reset to 0 if the enhancement rate of the reception quality of the reference signal is equal to or less than 10 dB. On the other hand, if the enhancement rate of the reception quality of the reference signal exceeds 10 dB before the expiration of the timer, it may be determined that the beam blockage has been released. In this case, the base station or the terminal may reset the timer to 0 or stop the timer. Also, the base station or the terminal may perform a beam activation operation or a beam switching operation.

The parameter used for determining the deterioration rate and the enhancement rate of the reception quality of the reference signal may be the 'preset reference value' or the 'preset reference value+timer'. The base station may transmit the parameter (e.g., the preset reference value, a setting value for the timer) used for determining the deterioration rate and the enhancement rate to the terminal through system information or a control message.

The above-described determination operation and the beam switching operation for the beam blockage based on the deterioration rate and the enhancement rate of the reception quality may be applied to the beam or radio link management operation (e.g., the beam or radio link problem detection operation, the beam or radio recovery operation, the beam or radio link failure declaration operation, etc.). However, the parameters (e.g., preset reference value, timer) used for determining the deterioration rate and the enhancement rate may be configured according to a purpose of each of the operations included in the beam or radio link management operation.

The parameters for measuring the reception quality of the reference signal in the beam or radio link management operation may include a measurement unit time, a measurement interval (or duration), a preset reference value for the deterioration rate of the reception quality of the reference signal, a preset reference value for the enhancement rate of the reception quality of the reference signal, and the like. Each of the measurement unit time and the measurement interval (or duration) may be configured as an absolute time (e.g., in units of millisecond (ms) or second, etc.), or in units of transmission timing intervals (TTIs), symbols, mini-slots, subframes, frames, scheduling periods, or the like. For example, each of the measurement unit time and the measurement interval (or duration) may be configured according to a configured cycle of a radio channel, an operation cycle of the base station, or an operation cycle of the terminal. The preset reference value for each of the deterioration rate and the enhancement rate of the reception quality of the reference signal may be configured to an absolute value (dBm) or a relative value (dB).

The reception quality of the reference signal may be a measurement result of the synchronization signal (e.g., SS/PBCH block), CSI-RS, phase tracking-reference signal (PT-RS), SRS, DMRS, or the like. The reception quality of the reference signal may be represented as reference signal received power (RSRP), reference signal received quality (RSRQ), received signal strength indicator (RSSI), signal-to-noise ratio (SNR), signal-to-interference ratio (SIR), or the like.

The measurement operation for the beam or radio link management described above may be performed by the base station or the terminal. Each of the base station and the terminal may perform the measurement operation according to the parameters configured for the measurement operation. The terminal may report the measurement result to the base station according to the parameters configured for the measurement reporting.

When the reception quality of the measured reference signal satisfies the preset condition (e.g., 'preset reference value' or 'preset reference value+timer'), the base station may start the beam or radio link management operation, the beam switching operation, the beam activation or inactivation operation according to the beam blockage, or the like, and may transmit a control message including information for the started operation to the terminal.

Also, when the reception quality of the measured reference signal satisfies the preset condition (e.g., 'preset reference value' or 'preset reference value+timer'), the terminal may report the measurement result to the terminal. In this case, the terminal may transmit to the base station a control message indicating that the beam or radio link management operation, the beam switching operation, the beam activation or inactivation operation according to the beam blockage, or the like is started.

The PHY layer, the MAC layer, and the RRC layer of each of the base station and the terminal may exchange control information for the measurement operation, the measurement reporting operation, the beam or radio link management operation, the beam switching operation, the beam activation or inactivation operation according to the beam blockage, or the like.

For example, the PHY layer may transmit the measurement result to the upper layer (e.g., MAC layer, RRC layer). Upon receiving the measurement result from the PHY layer, the MAC layer of the base station may generate a MAC control message for the beam or radio link management operation, the beam switching operation, the beam blockage determination operation, or the like when the measurement result satisfies the preset condition, and may transmit the MAC control message to the terminal. Alternatively, when the measurement result is received from the PHY layer, the MAC layer may transmit the measurement result to the RRC layer.

When the measurement result is received from the lower layer (e.g., PHY layer, MAC layer), the RRC layer of the base station may transmit to the terminal a control message instructing to perform the beam or radio link management operation, the beam switching operation, the beam blockage determination operation, or the like. Alternatively, the RRC layer of the base station may transmit to the lower layer of the base station (e.g., PHY layer, MAC layer) control information instructing to perform the beam or radio link management operation, the beam switching operation, the beam blockage determination operation, or the like.

Here, each of a report message including the measurement result and the control message requesting to perform the beam or radio link management operation, the beam switching operation, or the beam activation or inactivation operation according to the beam blockage may be a PHY layer control message, a MAC control message (e.g., MAC control PDU), or an RRC message. The PHY layer control message may be transmitted through a PDCCH, a PUSCH, or a common channel. The PHY layer control message may be a signal, at least one symbol, etc. of a control channel.

The control procedure for the beam blockage determination operation, the beam switching operation, and the beam activation or inactivation operation described above may be performed in conjunction with the beam or radio link management operation shown in FIG. 7 or FIG. 8. Alternatively, the control procedure for the beam blockage determination operation, the beam switching operation, and the beam activation or inactivation operation described above may be performed independently of the beam or radio link management operation shown in FIG. 7 or FIG. The beam switching operation within the system band_of the same base station may mean a switching operation of a frequency band (e.g., BWP) within the system bandwidth.

Each of the beam configuration information, the beam index mapping information, the configuration information of the reserved beam (e.g., candidate beam), the configuration information for the beam recovery operation, the configuration information for the beam reconfiguration information, the control message indicating that the beam recovery operation has been successfully completed, the control message indicating the beam reconfiguration operation has been successfully completed, the control message for the measurement result reporting, and the control message for the beam sweeping operation result reporting may include at least one of the following parameters.

Identifier of a cell or a BWP related to a BWP control operation

Configuration parameters of reference signals for the beam management operation or the beam measurement operation. The configuration parameters may include at least one of the flowing parameters.

Radio resource allocation parameter for reference signals (e.g., allocation information of time-frequency resources Index for identifying reference signals (e.g., identifier)

Parameter indicating mapping relationship of reference signals

The beam management operations described above may be configured and controlled to take into account a discontinuous reception (DRX) operation or a discontinuous transmission (DTX) operation performed at the terminal to reduce power consumption. The terminal performing the DRX operation may perform a reception operation in a predetermined time duration (e.g., 'on time' or 'active time') according to a DRX cycle, and may not perform a reception operation in a sleep duration (e.g., 'DRX off time'). The terminal performing the DTX operation may perform a transmission operation in a predetermined time duration (e.g., 'on time' or 'active time') according to a DTX cycle, and may not perform a transmission operation in a sleep duration (e.g., 'DTX off time').

The DRX operation or the DTX operation may affect the beam management operation of the terminal. In this case, each of the beam monitoring operation for beam management, the beam problem detection operation, the beam failure declaration operation, the beam recovery operation, the beam reconfiguration operation, and the beam pairing operation may be selectively restricted by the DRX operation or the DTX operation. Alternatively, the beam monitoring operation for beam management, the beam problem detection operation, the beam failure declaration operation, the beam recovery operation, the beam reconfiguration operation, and the beam pairing operation may all be stopped by the DRX operation or the DTX operation. For the DRX operation or the DTX operation, the parameters for each of the beam monitoring operation for beam management, the beam problem detection operation, the beam failure declaration operation, the beam recovery operation, the beam reconfiguration operation, and the beam pairing operation may be reset or reconfigured. Also, the timer for the beam management operation may be stopped, reset, or reconfigured.

For example, when the terminal performs the DRX operation, when the terminal enters the sleep duration according to the DRX cycle, when the terminal performs the DTX operation, or when the terminal enters the sleep duration according to the DTX cycle, the terminal may be configured or controlled not to perform some or all of the functions (e.g., the beam problem detection operation, the beam failure declaration operation, the beam recovery operation, the beam reconfiguration operation, etc.) of the beam management operation.

Here, by stopping a timer for a specific operation or inactivating the specific operation, all the functions of the beam management operation or some of the functions of the beam management operation may be configured or controlled not to be performed. In the case that the timer for the specific operation is stopped or the specific operation is inactivated, the specific operation may be performed again when the terminal goes out of the sleep duration according to the DRX cycle, when the terminal goes out of the sleep duration according to the DTX cycle or when the terminal enters the active time. In this case, the timer for the specific operation may be started or restarted, and counter parameters for the beam management operation may be reset or restarted from the stopped value.

The activation or inactivation of all or some of the functions of the beam management operation according to the DRX or DTX operation may be independently controlled or configured according to the DRX cycle, the DTX cycle, or the movement speed of the terminal (e.g., movement state).

When the DRX cycle, the DTX cycle, or the movement speed of the terminal satisfies a preset reference condition, all or some of the functions of the beam management operation may be inactivated. For example, when the DRX cycle or DTX cycle is equal to or longer than a predetermined cycle, all or some of the functions of the beam management operation may be inactivated. On the other hand, when the DRX cycle or DTX cycle is shorter than a predetermined cycle, all or some of the functions of the beam management operation may be activated. The preset reference condition (e.g., cycle) may be transmitted from the base station to the terminal through system information or an RRC control message.

When the movement speed of the terminal is equal to or greater than a preset speed, all or some of the functions of the beam management operation may be inactivated. On the other hand, when the movement speed of the terminal is less than a preset speed, all or some of the functions of the beam management operation may be activated. The preset reference condition (e.g., speed) may be transmitted from the base station to the terminal through system information or an RRC control message.

When necessary, for the activation or inactivation of all or some of the functions of the beam management operation, all of the DRX cycle, the DTX cycle, and the movement speed of the terminal may be considered. In order not to perform the beam problem detection operation, the beam recovery operation, or the beam recovery failure declaration operation, the terminal may request the base station to perform a beam switching operation based on the beam monitoring result or the beam measurement result. For this, an event for determining whether to perform a beam switching operation may be configured in the terminal, and the parameter for configuring the reference value for the quality of the beam or radio link may be applied.

The parameter for configuring the event and the reference value may be used for the terminal to determine whether to perform the beam switching operation by comparing a quality of a serving beam (e.g., active beam or scheduling beam) or a serving radio link (e.g., active radio link or a scheduling radio link), which is currently used for packet transmission and reception, with qualities of other beams or radio inks based on the reference signal (e.g., SS/PBCH block, CSI-RS, PT-RS, positioning reference signal (PRS), etc.). Here, the quality of the beam or radio link may be represented as a channel quality indicator (CQI), a channel state indicator (CSI), a received signal strength indicator (RSSI), a reference signal received power (RSRP), a reference signal received quality (RSRQ), or the like.

The terminal may transmit information requesting initiation of the beam switching operation to the base station using a PUCCH or a MAC control message. Here, each of the PUCCH or the MAC control message may include a bit (e.g., parameter) indicating the initiation of the beam switching operation, an identifier (e.g., index) indicating the beam, an identifier (e.g., index) of a reference signal having a mapping relationship with the beam For example, an index), and the like. Also, each of the PUCCH or the MAC control message may further include an identifier indicating a BWP. In order to request the initiation of the beam switching operation, the terminal may transmit to the base station a RA preamble having a mapping relationship with the beam (e.g., reference signal) for which switching is requested, an index of the RA preamble, or a radio resource index of the RA preamble (e.g., an identifier for identifying a radio resource of the RA preamble).

Upon receiving the information requesting the initiation of the beam switching operation from the terminal, the base station may transmit to the terminal a control message indicating whether the information requesting the initiation of the beam switching operation is received or not. Alternatively, the base station may perform the beam switching operation requested by the terminal without transmitting the control message indicating whether the information is received or not, and transmit signals to the terminal using the switched beam. Alternatively, when the beam switching operation has been completed, the base station may transmit a control message including information indicating that the beam switching operation has been completed to the terminal using the current serving beam. Thus, after transmitting the information requesting the initiation of the beam switching operation, the terminal may receive necessary control messages or packets from the base station by monitoring the current serving beam or the beam for which switching is requested (e.g., a switching target beam).

Also, when a plurality of cells provide a communication service to the terminal using a carrier aggregation (CA) function, the beam management operation shown in FIG. 7 or 8 may be applied to each of a primary cell (PCell) and a secondary cell (SCell). The beam management operation of the terminal may be independently applied to each of the primary cell and the secondary cell.

The cells supporting the independent beam management operation and the CA function may perform additional operations for the beam management operation of the secondary cell. For example, when a beam problem of the secondary cell is detected according to the beam management operation, the terminal may transmit to the primary cell information indicating that the beam problem of the secondary cell has been detected before performing the beam failure declaration operation or the beam recovery operation. The transmission operation of the information indicating that the beam problem of the secondary cell has been detected may be performed independently of each of the beam failure declaration operation and the beam recovery operation for the secondary cell. Also, the terminal may transmit information for identifying the beam in which the beam problem is detected in the secondary cell, information on a time elapsed from the time when the beam problem is detected in the secondary cell, and the like by applying the above-described configuration parameters.

As another method, when the beam problem is detected in the secondary cell, the terminal may define a timer (e.g., $T_{BR}$) or another timer (e.g., a timer for Scell beam recovery ($T_{S-BR}$)) for the beam recovery operation of the secondary cell, and may perform the beam recovery operation before expiration of the corresponding timer (i.e., the $T_{BR}$ or the $T_{S-BR}$). When a beam failure is declared as a result of the beam recovery operation for the secondary cell, the terminal may transmit a control message including information indicating that the beam failure has been declared at the time of the declaration of the beam failure.

The control message transmitted by the terminal to the primary cell for the beam problem detection operation or the beam recovery operation of the secondary cell may be a control field of a PHY layer control channel, a MAC control element, or an RRC message. The control message may include an identifier of a cell performing the beam problem detection operation and the beam recovery operation, information for identifying the corresponding beam (e.g., the beam in which the problem is detected), a measurement result of the corresponding beam, a measurement result of a candidate beam, information indicating whether or not a condition for performing a non-contention-based RA procedure is satisfied, a time point at which the beam problem is detected, a time elapsed from a time point at which the beam recovery operation is started, and the like. Also, the terminal may transmit a control message requesting inactivation of the secondary cell in which the beam problem is detected to the primary cell.

Upon receiving the control message indicating the beam problem detection, the beam recovery operation, the beam recovery failure, the beam failure declaration, or the request to inactivate the secondary cell from the terminal, the primary cell may inactivate the secondary cell indicated by the control message, and may transmit a control message indicating that the secondary cell is inactivated to at least one of the secondary cell and the terminal.

Also, the primary cell or the secondary cell may allocate an RA resource for performing a non-contention-based RA procedure or a contention-based RA procedure for one or more serving beams (e.g., configured beams, candidate beams) to the terminal. Here, the RA resource may be configuration parameters for PRACH transmission. For example, the RA resource may indicate an RA preamble index, masking information, a preamble format for the PRACH transmission, a time-frequency resource, and the like.

The terminal having transmitted the control message indicating the beam problem detection, the beam recovery operation, the beam recovery failure, or the beam failure declaration for the secondary cell may determine that the corresponding secondary cell is inactivated, and reconfigure the parameters for the corresponding secondary cell. Alternatively, when the control message indicating the inactivation of the secondary cell is received from the primary cell, the terminal may perform an operation according to the control message received from the primary cell. Upon receiving information on the RA resource for performing a contention-based RA procedure or a non-contention-based RA procedure from the primary cell or the secondary cell, the terminal may perform a contention-based RA procedure or a non-contention-based RA procedure by using the RA resource, thereby performing the beam recovery operation for the secondary cell.

Also, in the beam recovery operation for the secondary cell, the terminal may perform the RA procedure in the secondary cell. In the beam recovery operation after detecting the beam problem, the terminal may monitor/measure the beam of the secondary cell. In the case that the beam which satisfies with the criterion of the beam recovery (e.g., beam configuration) by monitoring/measuring the beam of the secondary cell is detected, the terminal may perform the RA procedure in the secondary cell using the RA resources corresponding to the detected beam.

Here, the RA procedure may be a contention-based RA procedure or a non-contention-based RA procedure. The RA resource (e.g., PRACH resource) for the non-contention-based RA procedure may be obtained from a response message to a CA connection configuration step or the reporting of the beam problem detection of the secondary cell.

When the non-contention-based RA procedure fails or a reference condition for the non-contention-based RA procedure is not satisfied after the detection of the beam problem of the secondary cell, the terminal may be controlled to perform a contention-based RA procedure in the primary cell or the secondary cell. For example, when the reception strength of the reference signal of the beam is equal to or greater than a reference value, the terminal may perform a non-contention-based RA procedure. On the other hand, when the reception strength of the reference signal of the beam is less than a reference value, the non-contentionbased RA procedure may be restricted. Here, the reference condition for the non-contention-based RA procedure may be defined as a threshold value for the reception strength of the reference signal of the beam. The reception strength of the reference signal (e.g., SS/PBCH block, CSI-RS, PT-RS, DMRS, etc.) may be represented as RSSI, RSRP, or RSRQ.

Also, a timer indicating an interval (or duration) during which a non-contention-based RA procedure for beam recovery may be performed may be configured. When the non-contention-based RA procedure has not been successfully completed before expiration of the timer, the terminal may be controlled to perform a contention-based RA procedure.

When a contention-based RA procedure for beam recovery is performed, the terminal may transmit a control message including at least one of an identifier of a cell performing the beam problem detection operation or the beam recovery operation, information for identifying the corresponding beam (e.g., the beam in which the problem is detected), a measurement result of the corresponding beam, a measurement result of a candidate beam, information indicating whether or not a condition for performing a non-contention-based RA procedure is satisfied, information indicating the inactivation of the cell (e.g., the cell in which the beam problem is detected), and a time elapsed from a time point at which the beam problem is detected (or, the initiation time of the beam recovery operation).

In the case that the secondary cell in which the beam problem is detected has been inactivated, the inactivated secondary cell may be activated again when the beam recovery operation for the secondary cell is completed. When the beam recovery is completed by the secondary cell's beam monitoring or measurement result instead of performing the RA procedure in the secondary cell or the transmission of the control message for beam recovery, the terminal may report information indicating completion of the beam recovery for the secondary cell to the primary cell. Upon receiving the information indicating that beam recovery for the secondary cell has been completed from the terminal, the primary cell may activate the secondary cell indicated by the information received from the terminal, and transmit control information for the activated secondary cell to at least one of the corresponding secondary cell and the terminal.

The cells supporting the independent beam management operation and the CA function may perform additional operations for the beam management operation of the primary cell. For example, when a beam problem of the primary cell is detected according to the beam management operation, the terminal may transmit information indicating that the beam problem of the primary cell has been detected before performing the beam failure declaration operation or the beam recovery operation. In this case, the terminal may transmit information for identifying the beam (e.g., the beam in which the problem is detected) of the primary cell, a measurement result of the beam, a measurement result of a candidate beam, information indicating whether or not a condition for performing a non-contention-based RA procedure is satisfied, a time elapsed from the time when the beam problem is detected (or, the initiation time of the beam recovery operation), and the like by applying the above-described configuration parameters.

As another method, when the beam problem is detected in the primary cell, the terminal may perform the beam recovery operation before expiration of a timer for a beam recovery operation of a primary cell (e.g., $T_{BR}$). In the case that a beam failure is declared as a result of the beam recovery operation for the primary cell, the terminal may transmit to the secondary cell a control message including information indicating that the beam failure has been declared at the time of the beam failure declaration.

When the control message indicating the detection of the beam problem of the primary cell, the beam recovery operation, the beam recovery failure, or the beam failure declaration is received from the terminal, the secondary cell may transmit the control message received from the terminal to the primary cell. When the control information indicating the occurrence of the problem with respect to the beam management operation is received from the secondary cell, the primary cell may stop transmission of packets to the terminal before receiving a control message indicating that the beam recovery operation has been successfully completed from the terminal. Also, the primary cell may transmit control information, reference signals, and the like for beam recovery to the terminal using a configured beam other than the serving beam of the terminal.

When there is not an RA attempt or a reception of information indicating that the beam recovery operation has been successfully completed within a period configured in consideration of the elapsed time from the beam problem detection, or a period configured regardless of the elapsed time, the primary cell may declare an RLF for the terminal. Also, the primary cell may determine the operational state of the terminal to be the RRC_INACTIVE state or the RRC_IDLE state, and release the connection with the terminal. Also, the primary cell may perform a connection reconfiguration procedure or a handover procedure for changing the secondary cell to a new primary cell.

When a connection reconfiguration procedure or a handover procedure for changing the secondary cell to a primary cell is performed due to the beam recovery failure of the primary cell (or, a failure of radio link recovery), the primary cell may transmit RRC context information (e.g., access stratum (AS) context information) to the secondary cell. Upon receiving the RRC context information of the terminal from the primary cell, the secondary cell may inform the terminal that the secondary cell has been changed to a primary cell by transmitting the RRC context information of the terminal to the terminal. That is, a control message indicating that the secondary cell has been changed to a new primary cell, or a control message for connection reconfiguration, which includes control information related to the change between the secondary cell and the primary cell, may be transmitted to the terminal.

Upon receiving the control message indicating that the secondary cell has been changed to a primary cell due to the beam recovery failure (or, radio link recovery failure) of the primary cell from the secondary cell, the terminal may delete the configuration parameters for the previous primary cell, and may reconfigure related parameters using the control message (e.g., control message for connection reconfiguration) received from the secondary cell.

The above-described beam or radio link management operation in a radio access section (e.g., access link) between the terminal and the base station may be applied to the beam or radio link management operation for the mobile XDU in the Xhaul network. The above-described function and role of the base station (e.g., the base stations 110-1 to 110-3 in FIG. 1, the base stations 320 and 330 in FIG. 3, the base stations 530 and 540 in FIG. 5, or the like), the above-described function and role of the RRH performing some functions of the radio protocol of the base station, or the above-described function and role of the TRP (e.g., the TRPs 350-1 and 350-2 in FIG. 3, the TRP 430 in FIG. 4, the TRP 550 in FIG. 5, or the like) performing some functions of the radio protocol of the base station may be performed by the XDUs (e.g., the serving XDU, the linking XDUs, the candidate linking XDUs, the target XDU, the candidate target XDU, or the like) other than the mobile XDU. The function and role of the terminal may be performed by the mobile XDU. The function and role of the XCU may be performed by an entity (e.g., the RRC layer of the LTE system) that supports radio resource control functions of the base station.

In the above-described embodiments, even when each of start, stop, reset, restart, and expiration of the defined timer is not described discriminately, each of start, stop, reset, restart, and expiration may mean the operation of the timer or the operation of the counter for the timer.

In the above-described embodiments, each of the cell and the base station may refer to a Node B, an evolved Node B (eNB), a base transceiver station (BTS), a radio base station, a radio transceiver, an access point (AP), an access node, a roadside unit (RSU), a radio remote head (RRH), a transmission point (TP), a transmission and reception point (TRP), a gNB, or the like.

Also, in the above-described embodiments, the terminal may refer to a terminal, an access terminal, a mobile terminal, a station, a subscriber station, a mobile station, a portable subscriber station, a node, a device, an Internet of Thing (IoT) device, a mounted module/device/terminal, an on-board device (OBD), an on-board terminal (OBT), or the like.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. A terminal in a communication system, the terminal comprising:
   a processor;
   a memory in electronic communication with the processor; and
   instructions stored in the memory and operable, when executed by the processor, to cause the terminal to:
   configure one or more cells with a base station;
   receive resource information of a random access (RA) procedure for beam failure recovery (BFR) of a first cell among the one or more cells from the base station;
   receive configuration information including timer information for the BFR from the base station;
   perform a measurement operation in the first cell of the base station; and
   when beam failure is detected in the first cell, perform a non-contention-based RA procedure using the resource information of the RA procedure for the BFR in the first cell of the base station before a timer corresponding to the timer information expires.

2. The terminal according to claim 1, wherein the instructions further cause the terminal to:
   when the beam failure is detected in the first cell, perform a contention-based RA procedure in the first cell of the base station after the timer expires.

3. The terminal according to claim 1, wherein the non-contention-based RA procedure is not performed after the timer expires.

4. The terminal according to claim 1, wherein the resource information includes at least one of a RA preamble index, masking information, a preamble format of a physical random access channel (PRACH), and time-frequency resources of the PRACH.

* * * * *